US012185195B2

(12) United States Patent
Wang

(10) Patent No.: US 12,185,195 B2
(45) Date of Patent: Dec. 31, 2024

(54) MULTICAST METHOD, APPARATUS, DEVICE, AND SYSTEM FOR MULTICAST GROUP OF VIRTUAL NETWORK GROUP

(71) Applicant: TENCENT TECHNOLOGY (SHENZHEN) COMPANY LIMITED, Guangdong (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 587 days.

(21) Appl. No.: 17/459,623

(22) Filed: Aug. 27, 2021

(65) Prior Publication Data
US 2021/0392469 A1 Dec. 16, 2021

Related U.S. Application Data

(63) Continuation of application No. PCT/CN2020/094236, filed on Jun. 3, 2020.

(30) Foreign Application Priority Data

Jun. 17, 2019 (CN) .......................... 201910523828.8

(51) Int. Cl.
H04W 4/08 (2009.01)
H04L 12/18 (2006.01)
H04L 12/46 (2006.01)

(52) U.S. Cl.
CPC ............. *H04W 4/08* (2013.01); *H04L 12/189* (2013.01); *H04L 12/4633* (2013.01); *H04L 12/4641* (2013.01)

(58) Field of Classification Search
CPC ........ H04W 4/08; H04W 4/06; H04L 12/189; H04L 12/4633; H04L 12/4641; H04L 12/185; H04L 67/14; H04L 67/146
(Continued)

(56) References Cited

U.S. PATENT DOCUMENTS

2018/0192289 A1 7/2018 Dao
2018/0234259 A1 8/2018 Du et al.
(Continued)

FOREIGN PATENT DOCUMENTS

| CN | 104579704 A | * | 4/2015 |
| CN | 110121155 A | | 8/2019 |

(Continued)

OTHER PUBLICATIONS

Translated Foreign CN104579704A.*
(Continued)

*Primary Examiner* — Obaidul Huq
(74) *Attorney, Agent, or Firm* — Sughrue Mion, PLLC

(57) ABSTRACT

A multicast method, apparatus, device, and system for a multicast group of a virtual network group are provided. The method includes: receiving a multicast data packet transmitted by a member of the virtual network group, a destination address of the multicast data packet being a multicast address; transmitting the multicast data packet to at least one target internal multicast interface, which is a dedicated interface for a multicast session; and transmitting the multicast data packet to all members or all local multicast group members of the virtual network group through the at least one target internal multicast interface. The disclosure implements multicast communication in a 5G virtual network (VN).

18 Claims, 18 Drawing Sheets

(58) Field of Classification Search
USPC .................................................. 370/310, 312
See application file for complete search history.

(56) References Cited

U.S. PATENT DOCUMENTS

2020/0351984 A1* 11/2020 Talebi Fard .......... H04W 76/40
2021/0274323 A1* 9/2021 Xu .......................... H04W 4/08

FOREIGN PATENT DOCUMENTS

| CN | 110247779 A | 9/2019 |
| CN | 111200791 A | 5/2020 |
| WO | 2018/175974 A1 | 9/2018 |

OTHER PUBLICATIONS

Extended European Search Report dated Oct. 7, 2022 issued in European Application No. 20825817.8.
Translation of the Written Opinion dated Sep. 4, 2020 issued by the International Searching Authority in Application No. PCT/CN2020/094236.
Support for Groupcast Traffic Forwarding of a 5G VN'. Tencent, SA WG2 Meeting #134, S2-1907545, Jun. 24-28, 2018, Sapporo, Japan (4 pages total).
"Support for broadcast traffic forwarding of a 5G VN", Tencent, SA WG2 Meeting #134, S2-1907142, Jun. 24-28, 2019, Sapporo, Japan (5 pages total).
"Support of forwarding of broadcast and multicast packets", Huawei, HiSilicon, 3GPP TSG-SA2 Meeting #134, S2-1907700, Jun. 24-28, 2019, Sapporo, Japan (10 pages total).
"5G LAN group communication with UPF autonomous traffic forwarding", Nokia, Nokia Shanghai Bell, SA WG2 Meeting #133, S2-1905197, May 13-17, 2019, Reno, Nevada, USA (10 pages total).
"Data forwording for 5G-LAN multicast", OPPO, 3GPP TSG-SA WG2 Meeting #133, S2-1906564, May 13-17, 2019, Reno, USA (6 pages total).
Office Action dated Oct. 31, 2022 issued in Japanese Application No. 2021-550282.
First Office Action of CN Application No. 201910523828.8 dated Feb. 19, 2021.
International Search Report of PCT/CN2020/094236 dated Sep. 4, 2020 [PCT/ISA/210].
Written Opinion of PCT/CN2020/094236 dated Sep. 4, 2020 [PCT/ISA/237].

* cited by examiner

MULTICAST METHOD, APPARATUS, DEVICE, AND SYSTEM FOR MULTICAST GROUP OF VIRTUAL NETWORK GROUP

CROSS-REFERENCE TO RELATED APPLICATION

This application is a continuation application of International Application No. PCT/CN2020/094236, filed Jun. 3, 2020, which claims priority to Chinese Patent Application No. 201910523828.8, filed on Jun. 17, 2019 with the China National Intellectual Property Administration, the disclosures of which are incorporated by reference in their entireties.

FIELD

The disclosure relates to the communications field, and in particular, to a multicast method, apparatus, device, and system for a multicast group of a virtual network group.

BACKGROUND

Ethernet communication is introduced in a 5G system.

A definition of a 5G virtual network group (5G VN group) that supports IP and Ethernet communication is introduced in Release 16 of a New Radio (NR) system. In addition, a one-to-one communication method based on a user plane function (UPF) network interface is proposed in the 5G VN group.

However, the 5G VN group in the related art cannot implement a one-to-multiple communication solution.

SUMMARY

Embodiments of the disclosure provide a multicast method, apparatus, device, and system for a multicast group of a virtual network group. A target internal multicast interface in a user plane function (UPF) is used for transmitting a multicast data packet to all members or all local members of the multicast group, to implement a one-to-multiple communication solution in the virtual network group. The technical solutions are as follows:

According to an aspect of the disclosure, a multicast method for a multicast group of a virtual network group is provided, where the method is applicable to a UPF, and the method includes:

receiving a multicast data packet transmitted by a member of the virtual network group, a destination address of the multicast data packet being a multicast address; and transmitting the multicast data packet to at least one target internal multicast interface, and transmitting the multicast data packet to all multicast group members or all local multicast group members of the multicast group through the at least one target internal multicast interface, wherein the at least one target internal multicast interface is a dedicated interface for a multicast session;

the multicast group being a conventional multicast group in the virtual network group, or the multicast group being a group identified by using a virtual local area network identity (VID), the multicast group member being a VID member, and the multicast data packet being a data packet transmitted by using a broadcast address of the VID.

According to another aspect of the disclosure, a multicast method for a multicast group of a virtual network group is provided, where the method is applicable to a session management function (SMF), and the method includes:

generating at least two groups of multicast rules corresponding to at least one target internal multicast interface, wherein the at least one target internal multicast interface is a dedicated interface for a multicast session;

determining a multicast rule required on each UPF corresponding to the multicast group from the at least two groups of multicast rules, the multicast group being a conventional multicast group in the virtual network group, or the multicast group being a group identified by using a VID; and configuring the required multicast rule for each UPF.

According to another aspect of the disclosure, a multicast apparatus for a multicast group of a virtual network group is provided, where the apparatus includes:

a receiving module, configured to receive a multicast data packet transmitted by a member of the virtual network group, a destination address of the multicast data packet being a multicast address; and a transmitting module, configured to transmit the multicast data packet to at least one target internal multicast interface, and transmit the multicast data packet to all multicast group members or all local multicast group members of the multicast group through the at least one target internal multicast interface, wherein the at least one target internal multicast interface is a dedicated interface for a multicast session;

the multicast group being a conventional multicast group in the virtual network group, or the multicast group being a group identified by using a VID, the multicast group member being a VID member, and the multicast data packet being a data packet transmitted by using a broadcast address of the VID.

According to another aspect of the disclosure, a multicast apparatus for a multicast group of a virtual network group is provided, where the apparatus includes at least one memory configured to store program code; and at least one processor configured to read the program code and operate as instructed by the program code, the program code including:

generation code configured to cause the at least one processor to generate at least two groups of multicast rules corresponding to at least one target internal multicast interface;

determining code configured to cause the at least one processor to determine a multicast rule required on each UPF corresponding to the multicast group from the at least two groups of multicast rules, the multicast group being a conventional multicast group in the virtual network group, or the multicast group being a group identified by using a VID; and configuration code configured to cause the at least one processor to configure the required multicast rule for each UPF.

According to another aspect of the disclosure, a computer device is provided, where a UPF is running on the computer device, and the computer device includes a processor and a memory, where the memory stores a computer program, and the computer program is loaded and executed by the processor to implement the multicast method for a multicast group of a virtual network group according to the foregoing aspect.

According to another aspect of the disclosure, a computer device is provided, where an SMF is running on the computer device, and the computer device includes a processor and a memory, where the memory stores a computer program, and the computer program is loaded and executed by the processor to implement the multicast method for a multicast group of a virtual network group according to the foregoing aspect.

According to another aspect of the disclosure, a non-transitory computer-readable storage medium is provided, the storage medium storing at least one instruction, at least one program, a code set, or an instruction set, the at least one instruction, the at least one program, the code set, or the instruction set being loaded and executed by a processor to implement the multicast method for a multicast group of a virtual network group according to the foregoing aspect.

BRIEF DESCRIPTION OF THE DRAWINGS

To describe technical solutions in example embodiments of the disclosure more clearly, the following briefly introduces the accompanying drawings for describing the embodiments. The accompanying drawings in the following description show only some embodiments of the disclosure, and a person of ordinary skill in the art may still derive other accompanying drawings from these accompanying drawings without creative efforts.

DETAILED DESCRIPTION

To make objectives, technical solutions, and advantages of the disclosure clearer, the following further describes implementations of the disclosure in detail with reference to the accompanying drawings.

Figure 1:
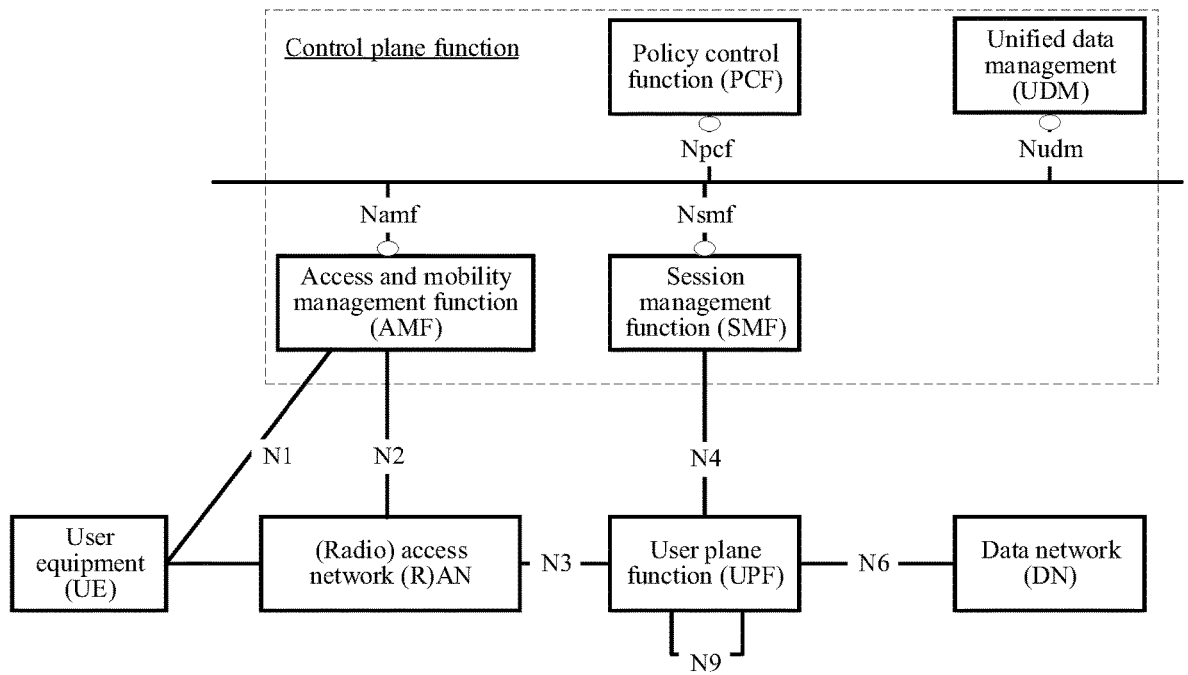
FIG. 1 is a block diagram of a 5G communications system according to an example embodiment of the disclosure.

FIG. 1 shows a block diagram of a 5G communications system according to an example embodiment of the disclosure. The communications system may be a 5G New Radio (NR) system, or includes a 5G system based on an Evolved Universal Mobile Telecommunications System (UMTS) Terrestrial Radio Access Network (eUTRAN) and a subsequent evolved system of the 5G system. The communications system is defined to support data connections and services so that technologies such as network function virtualization (NFV) and software-defined networking (SDN) may be used in network deployment. The communications system mainly includes a network function (NF), and is deployed as required by using distributed functions. The addition and withdrawal of a new network function do not affect the overall network functions. The communications system includes user equipment (UE) (named for a mobile terminal by 3rd Generation Partnership Project (3GPP)), a (radio) access network ((R)AN), a user plane function (UPF), a data network (DN), and control plane functions. Hereinafter, for description purposes, the term "radio access network (RAN)" is interchangeably used with a (radio) access network ((R)AN). That is, the term "radio access network (RAN)" may include a radio access network and/or an access network.

The control plane functions include an access and mobility management function (AMF), a session management function (SMF), a policy control function (PCF), and unified data management (UDM).

The UE communicates with the RAN through an air interface. The RAN communicates with the UPF through a first reference point N3. Two UPFs communicate with each other through a second reference point N9. A protocol data unit session anchor user plane function (PSA UPF) communicates with the DN through a third reference point N6.

There may be a plurality of UEs, RANs, UPFs, and DNs. When there are a plurality of UPFs, some UPFs are PSA UPFs of the UE. Two PSA UPFs communicate with each other through a fourth reference point N19 (not shown in FIG. 1).

The UE communicates with the AMF through a fifth reference point N1. The RAN communicates with the AMF through a seventh reference point N2. The UPF communicates with the SMF through an eighth reference point N4.

The network architecture shown in FIG. 1 includes the following reference points:

N1: reference point between the UE and the AMF;
N2: reference point between the (R)AN and the AMF;
N3: reference point between the (R)AN and the UPF;
N4: reference point between the SMF and the UPF;
N6: reference point between the PSA UPF and the DN;
N9: reference point between two UPFs;
N14: reference point between two AMFs (not shown in FIG. 1);
N19: reference point between two PSA UPFs of a 5G LAN service (not shown in FIG. 1).

The network architecture shown in FIG. 1 includes the following service-based interfaces:

Namf: service-based interface displayed by the AMF;
Nsmf: service-based interface displayed by the SMF;
Npcf: service-based interface displayed by the PCF;
Nudm: service-based interface displayed by the UDM.

Communication of a virtual network group includes one-to-one communication and one-to-multiple communication. One-to-one communication supports forwarding unicast communication between two UEs in a virtual network group or between a UE and a device on a DN. One-to-multiple communication supports forwarding of multicast data from a UE (or a device on a DN) to a plurality of UEs in a virtual network group and devices on the DN, or forwarding of multicast data from a UE (or a device on a DN) to all UEs in a multicast group and devices on the DN.

There may be a plurality of multicast groups in the virtual network group. Multicast communication means that multicast data transmitted by a member (UE or device) in a virtual network group needs to be transferred to each multicast group member of a corresponding multicast group. Based on the communications system shown in FIG. 1, an embodiment of the disclosure supports three multicast communication manners.

First manner: local exchange manner (based on the first reference point N3 or the second reference point N9):

When multicast group members of a multicast group include two UEs connected to the same PSA UPF, multicast data between the two UEs is directly exchanged inside the PSA UPF instead of being transmitted beyond the third reference point N6, and is then returned by an external router or a switch.

Figure 2:
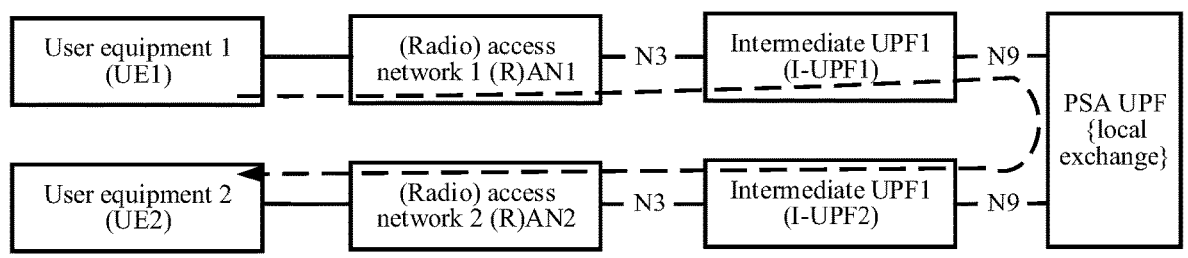
FIG. 2 is a schematic diagram of N3/N9-based multicast communication according to an example embodiment of the disclosure.

With reference to FIG. 2, UE1 communicates with RAN1, and RAN1 communicates with intermediate UPF1; and UE2 communicates with RAN2, and RAN2 communicates with UPF2. Both UE1 and UE2 are connected to the same PSA UPF. When UE1 transmits a multicast data packet, the multicast data packet is directly exchanged inside the PSA UPF, so that the multicast data packet is transmitted to UE2, and the multicast data packet does not need to be transmitted beyond the third reference point N6.

Second manner: a manner based on the third reference point N6:

When multicast group members of a multicast group include one UE and one device on a DN, multicast data between the UE and the device needs to be exchanged through N6.

Figure 3:
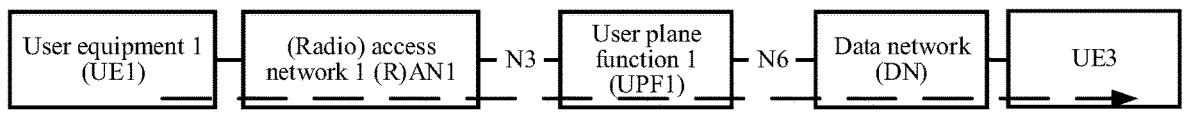
FIG. 3 is a schematic diagram of N6-based multicast communication according to an example embodiment of the disclosure.

With reference to FIG. 3, UE1 communicates with RAN1, RAN1 communicates with UPF1, and PSA UPF1 communicates with a DN. When transmitting a multicast data packet, UE1 needs to transfer the multicast data packet to UE3 on the DN through N6.

Third manner: a manner based on the fourth reference point N19:

When multicast group members of a multicast group include two UEs connected to different PSA UPFs, multicast data between the two UEs needs to be exchanged through the fourth reference point N19, and an N19 tunnel is established between the two PSA UPFs.

Figure 4:
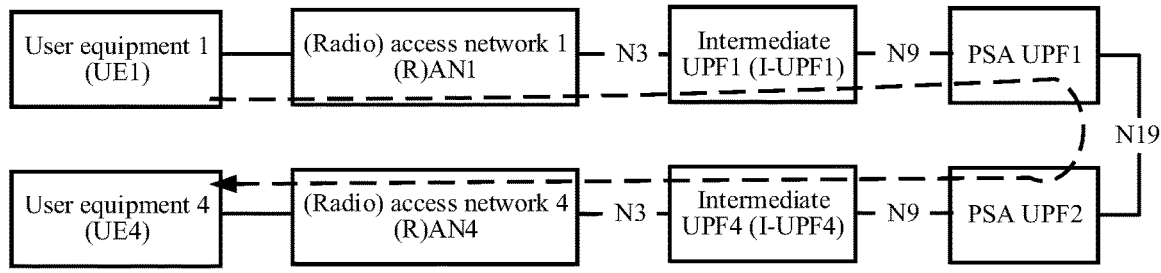
FIG. 4 is a schematic diagram of N19-based multicast communication according to an example embodiment of the disclosure.

With reference to FIG. 4, UE1 communicates with RAN1, and RAN1 communicates with intermediate UPF1; and UE4 communicates with RAN4, and RAN4 communicates with UPF4. UE1 and UE2 are respectively connected to different PSA UPFs, PSA UPF1 and PSA UPF2. An N19 tunnel is established between the two PSA UPFs. When transmitting a multicast data packet, UE1 needs to exchange the multicast data packet through the N19 tunnel between the two PSA UPFs, so as to transmit the multicast data packet to UE4.

Figure 5:
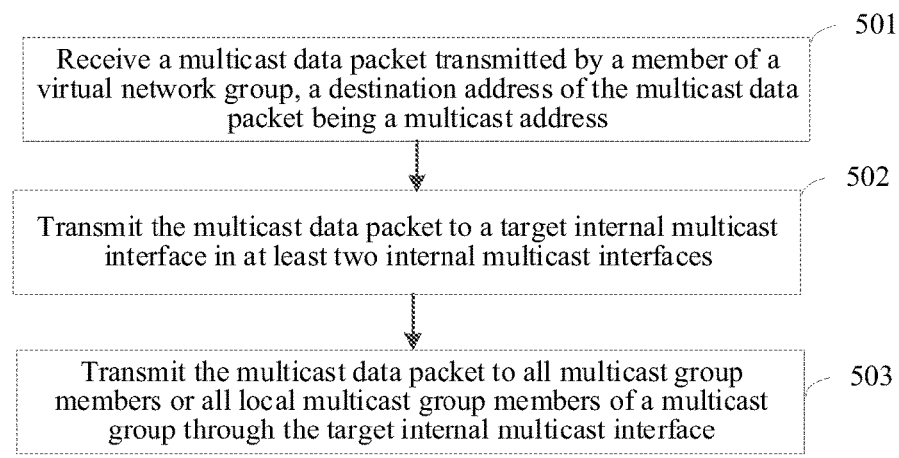
FIG. 5 is a flowchart of a multicast method for a virtual network group according to an example embodiment of the disclosure.

FIG. 5 shows a flowchart of a multicast method for a multicast group of a virtual network group according to an example embodiment of the disclosure. The method may be performed by a first UPF. The method includes the following steps 501-503:

Step 501: The first UPF receives a multicast data packet transmitted by a member of a virtual network group, a destination address of the multicast data packet being a multicast address.

The multicast data packet is determined by using a destination IP address or a destination MAC address. For example, a destination IP/MAC address in the multicast data packet is a multicast address, there may be a plurality of multicast addresses (for example, three or five) in the same virtual network group, and a plurality of multicast addresses may form a multicast address list. A destination address in a multicast data packet only needs to be one multicast address in a multicast address list.

Step 502: The first UPF transmits the multicast data packet to at least one target internal multicast interface. The at least one target internal multicast interface may be a dedicated interface for a multicast session.

Figure 6:
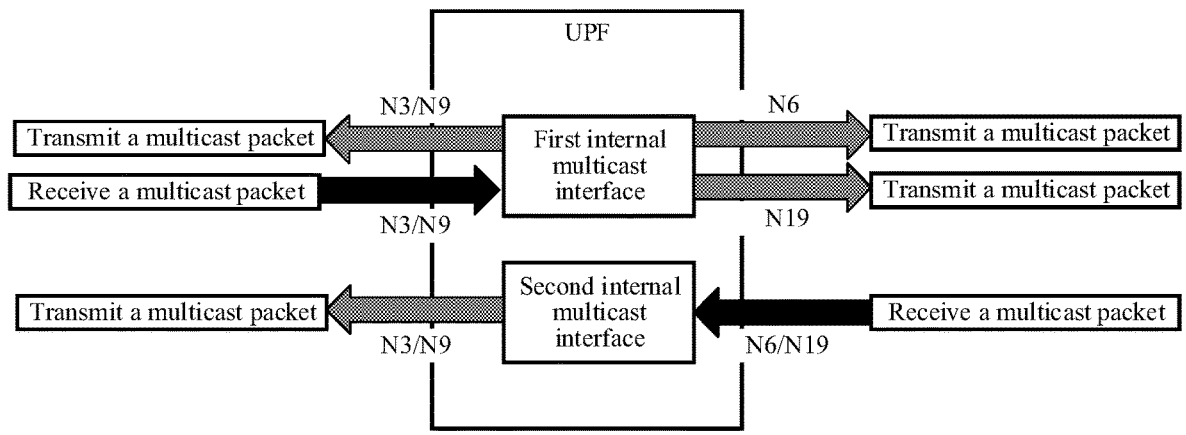
FIG. 6 is a block diagram of two internal multicast interfaces according to an example embodiment of the disclosure.

A PSA UPF provides at least two internal multicast interfaces. With reference to FIG. 6, the at least one target internal multicast interface may include:

A first internal multicast interface: used for receiving a multicast data packet transmitted by a local multicast group member through N3/N9, and transmitting the multicast data packet to all multicast group members (which may include the transmitting member itself) of a multicast group through at least one reference point of N3/N9, N6, and N19. A 5G system is used as an example. The first internal multicast interface may be referred to as 5G VN BC internal R or another name.

A second internal multicast interface: used for transmitting, through N3/N9 to all local multicast group members of a multicast group in a PSA UPF, a multicast data packet transmitted by a non-local multicast group member through N6/N19. A 5G system is used as an example. The second internal multicast interface may be referred to as 5G VN BC internal C or another name.

In an embodiment, a local multicast group member includes a UE that uses a current UPF as a protocol data unit (PDU) session anchor in the multicast group.

Step 503: The first UPF transmits the multicast data packet to all multicast group members or all local multicast group members of a multicast group through the target internal multicast interface.

In conclusion, according to the method provided in this embodiment, when receiving a multicast data packet transmitted by a member in a virtual network group, a UPF calculates, according to a multicast address, a multicast group member that needs to receive the multicast data packet, transmits the multicast data packet to a target internal multicast interface, which is a dedicated interface for a multicast session, and transmits the multicast data packet to all members of a multicast group through the target internal multicast interface, so that one-to-multiple network communication is implemented in the virtual network group, thereby implementing a multicast function in the virtual network group.

There are two types of multicast groups:

First: Conventional multicast group; and

Second: Virtual local area network identity (VID), where each virtual local area network (VLAN) is represented by using one VID, and a VID broadcast formed by one "VID and broadcast address" is considered as communication of a multicast group. For example, an IPv4 broadcast address is 255.255.255.255 or 192.168.1.255, and a broadcast MAC address is FF:FF:FF:FF:FF:FF.

The at least two internal multicast interfaces of the UPF at least have the following different implementations:

First Implementation: Two Internal Multicast Interfaces

Including a first internal multicast interface and a second internal multicast interface;

Second Implementation: Three Internal Multicast Interfaces

Including first internal multicast interface, a second internal multicast interface, and a third internal multicast interface;

Third Implementation: A Plurality of Internal Multicast Interfaces

Including one first internal multicast interface and n second internal multicast interfaces, wherein each second internal multicast interface corresponds to one multicast address, and n is a quantity of multicast addresses; or one first internal multicast interface, n second internal multicast interfaces, and n third internal multicast interfaces, wherein each second internal multicast interface corresponds to one multicast address, each third internal multicast interface corresponds to one multicast address, and n is a quantity of multicast addresses; or n first internal multicast interfaces and n second internal multicast interfaces, wherein each first internal multicast interface corresponds to one multicast address, each second internal multicast interface corresponds to one multicast address, and n is a quantity of multicast addresses; or n first internal multicast interfaces, n second internal multicast interfaces, and n third internal multicast interfaces, wherein each first internal multicast interface corresponds to one multicast address, each second internal multicast interface corresponds to one multicast address, each third internal multicast interface corresponds to one multicast address, and n is a quantity of multicast addresses.

In the following embodiments, a single PSA UPF is used for describing the internal multicast interface. However, an entire transmission process of a multicast data packet may involve a plurality of PSA UPFs. A processing process of each PSA UPF is the same or similar. Multicast communication in an entire virtual network group is implemented through transmission among a plurality of PSA UPFs. Details are not described for each PSA UPF in this specification.

Figure 7:
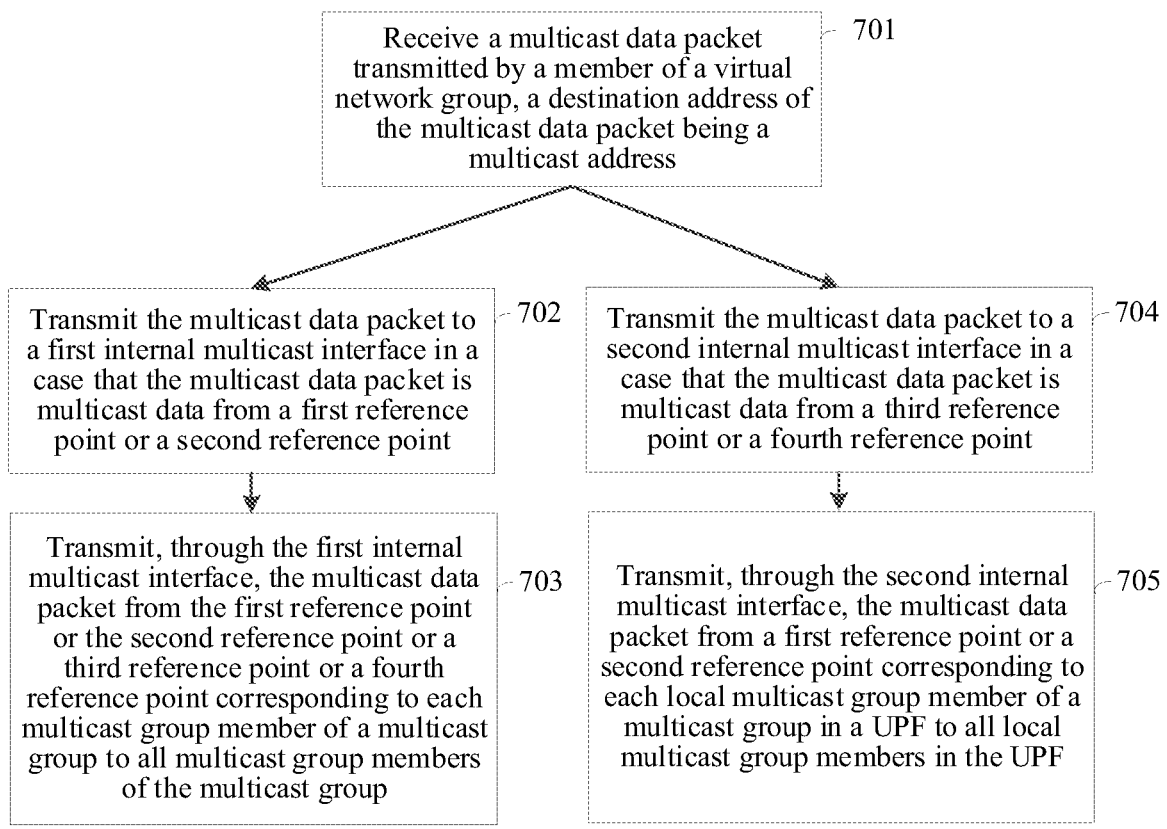
FIG. 7 is a flowchart of a multicast method for a virtual network group according to an example embodiment of the disclosure.

For a First Implementation of a Conventional Multicast Group:

FIG. 7 shows a flowchart of a multicast method for a multicast group of a virtual network group according to an example embodiment of the disclosure. The method may be performed by a first UPF, and the method includes the following steps:

Step 701: The first UPF receives a multicast data packet transmitted by a member of a virtual network group, a destination address of the multicast data packet being a multicast address.

It is assumed that the member transmitting the multicast data packet is member A, and member A may be any member of the virtual network group. Member A may be a multicast group member of a multicast group, or may not be a multicast group member of a multicast group. The same member may be connected to one multicast group or a plurality of multicast groups. In this embodiment, an example in which member A is connected to a multicast group member of a multicast group is used for description.

When the multicast group member A is connected to a plurality of multicast groups, and each multicast group corresponds to one multicast address, the destination address of the multicast data packet is one multicast address of a plurality of multicast addresses.

When the multicast group member A is a local multicast group member in the first UPF, the first UPF receives the multicast data packet of member A through N3 or N9. When the multicast group member A is a non-local multicast group member in the first UPF, the first UPF receives the multicast data packet of member A through N6 or N19.

Step 702: The first UPF transmits the multicast data packet to a first internal multicast interface when the multicast data packet is multicast data from a first reference point or a second reference point.

When receiving a multicast data packet transmitted by a local multicast group member through N3 or N9, the first UPF transmits the multicast data packet to the first internal multicast interface.

Step 703: The first UPF transmits, through the first internal multicast interface, the multicast data packet from the first reference point or the second reference point or a third reference point or a fourth reference point corresponding to each multicast group member of a multicast group to all multicast group members of the multicast group.

Figure 8:
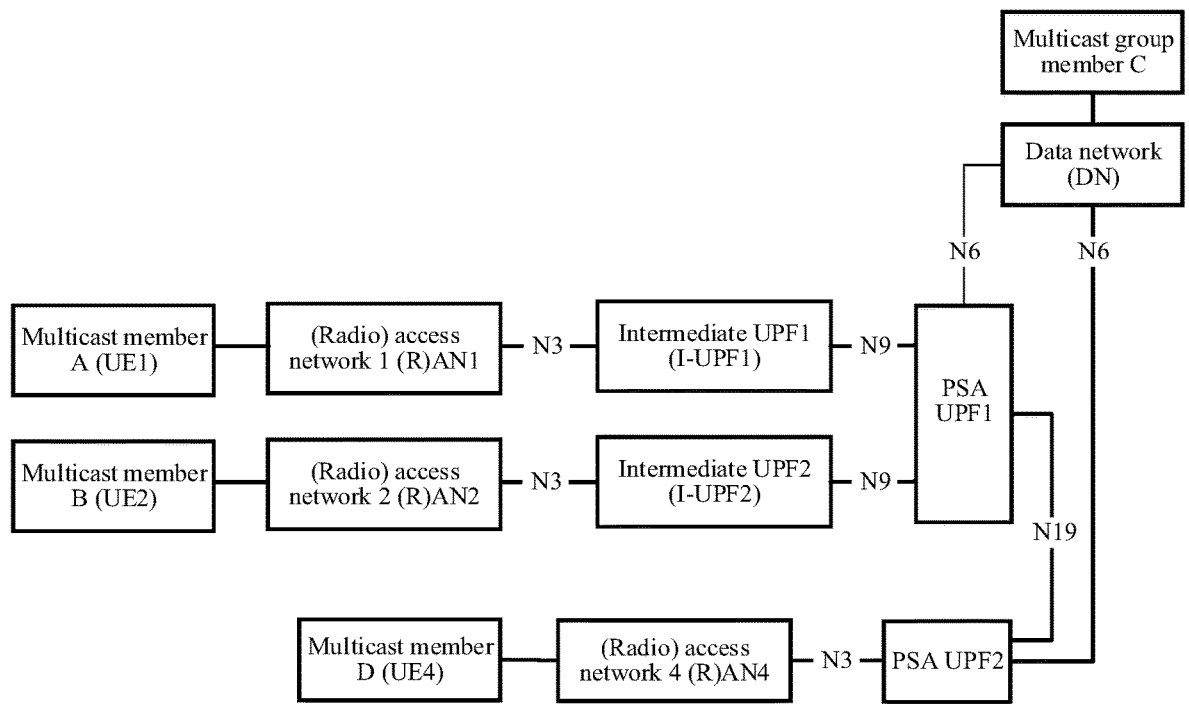
FIG. 8 is a schematic diagram of a virtual network group according to an example embodiment of the disclosure.

For example, member A, member B, member C, and member D belong to the same multicast group. When the multicast group member B is a member connected to the same PSA UPF as the multicast group member A, the first internal multicast interface transmits the multicast data packet to the multicast group member B through N3 or N9 corresponding to the multicast group member B. When the multicast group member C is a device on a DN, the first internal multicast interface transmits the multicast data packet to the multicast group member C through N6 corresponding to the multicast group member C. When the multicast group member D is a member connected to a different PSA UPF from the multicast group member A, the first internal multicast interface transmits the multicast data packet to the multicast group member D through N19 corresponding to the multicast group member D, as shown in FIG. 8.

"All multicast group members" in this step may include the member that transmits the multicast data packet, or may not include the member that transmits the multicast data packet.

Step 704: The first UPF transmits the multicast data packet to a second internal multicast interface when the multicast data packet is multicast data from a third reference point or a fourth reference point.

When receiving a multicast data packet transmitted by a non-local multicast group member through N6 or N19, the first UPF transmits the multicast data packet to the second internal multicast interface.

Step 705: The first UPF transmits, through the second internal multicast interface, the multicast data packet from a first reference point or a second reference point corresponding to each local multicast group member in the first UPF to all local multicast group members in the first UPF.

In an example shown in FIG. 8, when the multicast group member C transmits a multicast data packet, PSA UPF1 receives the multicast data packet from N6, places the multicast data packet into a second internal multicast interface thereof, transmits the multicast data packet to the multicast group member A through the second internal multicast interface and N9 corresponding to the multicast group member A, and transmits the multicast data packet to the multicast group member B through N9 corresponding to the multicast group member B. PSA UPF2 also receives the multicast data packet from N6, places the multicast data packet into a second internal multicast interface thereof, and transmits the multicast data packet to member D through the second internal multicast interface and N3 corresponding to member D. In this way, the multicast data packet transmitted by the multicast group member C is transmitted to all multicast group members.

In another example shown in FIG. 8, when the multicast group member A transmits a multicast data packet, PSA UPF1 receives the multicast data packet from N9, places the multicast data packet into a first internal multicast interface thereof, transmits the multicast data packet from N6 corresponding to the multicast group member C to the multicast group member C through the first internal multicast interface, and transmits the multicast data packet from N9 corresponding to the multicast group member B to the multicast group member B through the first internal multicast interface (PSA UPF1 may also transmit the multicast data packet from N9 to PSA UPF2 according to network configuration). PSA UPF2 receives the multicast data packet from N19, and places the multicast data packet into a second internal multicast interface thereof, and transmits the multicast data packet to the local multicast group member D through the second internal multicast interface and N3. In this way, the multicast data packet transmitted by the multicast group member A is transmitted to all multicast group members.

In conclusion, according to the method provided in this embodiment, with a first internal multicast interface being provided in a UPF, when a multicast data packet of a local multicast group member is received, the multicast data packet of the local multicast group member is first transmitted to the first internal multicast interface, and then is transmitted to all multicast group members of a multicast group through the first internal multicast interface (in a path other than the current UPF, a second internal multicast interface or a third internal multicast interface of another UPF may be further required to transmit the multicast data packet to all the multicast group members of the multicast group), so that multicast communication in the multicast group may be implemented.

According to the method provided in this embodiment, with a second internal multicast interface being provided in a UPF, when a multicast data packet of a non-local multicast group member is received, the multicast data packet of the non-local multicast group member is first transmitted to the second internal multicast interface, and then is transmitted to all local multicast group members connected to the UPF through the second internal multicast interface, so that multicast communication in a multicast group may be implemented, unnecessary traffic forwarding may be avoided, and network transmission resources may be saved.

In an example embodiment based on FIG. 7, an implementation process of multicast traffic forwarding in a multicast group is as follows: For each UPF in the multicast group, at least two internal multicast interfaces in the UPF are used. Two steps are used for detecting multicast data packet forwarding between internal multicast interfaces of each UPF.

In a first step, a packet detection rule (PDR) installed in the UPF detects a multicast data packet received from a member in any multicast group (through N3, N9, N6, or N19). After the multicast data packet matches the PDR, a forwarding action rule (FAR) in the UPF is applied to forward the multicast data packet to an internal multicast interface of the UPF, that is, a destination interface specified for the internal multicast interface.

In a second step, a PDR installed in the internal multicast interface of the UPF detects the multicast data packet. After the multicast data packet matches the PDR, a corresponding FAR in the internal multicast interface is applied to forward the multicast data packet to all multicast group members or all local multicast group members through N3, N6, N9, or N19.

Therefore, for each UPF in the multicast group, an N4 rule (that is, a PDR and an FAR) is configured, and an example configuration of the PDR and the FAR is as follows:

First PDR and First FAR

An SMF provides a first PDR and a first FAR for an N4 session of each multicast group member of the multicast group (that is, an N4 session corresponding to a PDU session of each member), so that the UPF processes a multicast data packet received from the UE.

Figure 9:
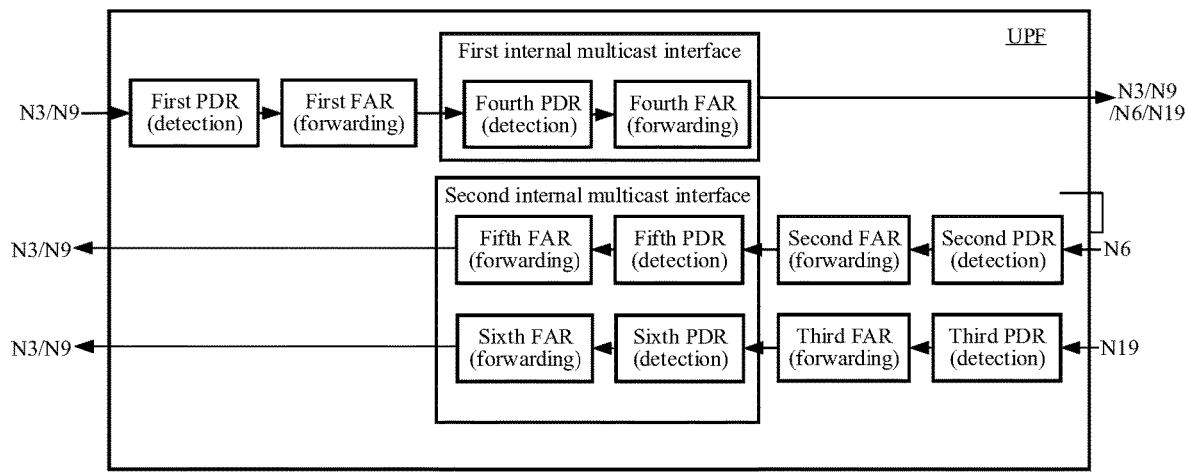
FIG. 9 is a schematic diagram of rule configuration of two internal multicast interfaces according to an example embodiment of the disclosure.

For each UPF in the multicast group, a first PDR and a first FAR that correspond to each local multicast group member are specified in the UPF. When detecting, by using the first PDR, that the multicast data packet is multicast data from the first reference point N3 or the second reference point N9, the UPF transmits the multicast data packet to the first internal multicast interface by using the first FAR, as shown in FIG. 9.

To detect traffic, the first PDR includes that: a source interface is set to an access side, a target address is set to a first multicast address list to which a multicast group member belongs, and core network tunnel information is set to a tunnel header of a first reference point or a second reference point of a PDU session (including an uplink IP address and uplink GTP-U TED information that correspond to the N3 or N9 interface), where GTP-U TED is the abbreviation of GPRS tunnel protocol tunnel endpoint identifier.

To forward traffic, the first FAR includes that: a target interface is set to the first internal multicast interface.

Second PDR and Second FAR

An SMF configures a second PDR and a second FAR that correspond to a group-level session to a UPF that has a need, so that the UPF processes a multicast data packet received through the third reference point N6. The group-level session is a session shared by all multicast group members in a multicast group. The group-level session is a session between the UPF and the SMF, that is, a group-level N4 session.

For a UPF that has a need in a multicast group, a second PDR and a second FAR that correspond to a group-level session are specified in the UPF. When it is detected by using the second PDR that the multicast data packet is multicast data from the third reference point N6, the multicast data packet is transmitted to the second internal multicast interface by using the second FAR, as shown in FIG. 9.

To detect traffic, the second PDR includes that: a source interface is set to a core side, and a target address is set to a second multicast address list, where the second multicast address list is a multicast address list corresponding to another multicast group member connected to a local multicast group member through the third reference point N6.

To forward traffic, the second FAR includes that: a target interface is set to the second internal multicast interface.

Third PDR and Third FAR

An SMF configures a third PDR and a third FAR that correspond to a group-level session to a UPF that has a need, so that the UPF processes a multicast data packet received through the fourth reference point N19.

For a UPF that has a need in a multicast group, a third PDR and a third FAR that correspond to a group-level session are specified in the UPF. When it is detected by using the third PDR that the multicast data packet is multicast data from the fourth reference point N19, the multicast data packet is transmitted to the third internal multicast interface by using the third FAR, as shown in FIG. 9.

To detect traffic, the third PDR includes that: a source interface is set to a core side, a target address is set to a third multicast address list, and core network tunnel information is set to a tunnel header of the fourth reference point (including a receive IP address and receive GTP-U TED information that correspond to the N19 interface), where the third multicast address list is a multicast address list corresponding to another multicast group member connected to a local multicast group member through the fourth reference point N19.

To forward traffic, the third FAR includes that: a target interface is set to the second internal multicast interface.

Fourth PDR and Fourth FAR

An SMF provides a fourth PDR and a fourth FAR for an N4 session of each multicast group member of the multicast group (that is, an N4 session corresponding to a PDU session of each member), so that the UPF processes a multicast data packet received from the UE.

For a UPF that has a need in a multicast group, a fourth PDR and a fourth FAR that correspond to each local multicast group member are specified in the UPF. When detecting, by using the fourth PDR, that the multicast data packet is multicast data from the first internal multicast interface, the UPF transmits, by using the fourth FAR, the multicast data packet from the first reference point or the second reference point or the third reference point or the fourth reference point corresponding to each multicast group member of a multicast group to all multicast group members of the multicast group, as shown in FIG. 9.

To detect traffic, the fourth PDR includes that: a source interface is set to the first internal multicast interface, and a target address is a first multicast address list to which a multicast group member belongs.

To forward traffic, corresponding to a local multicast group member, the fourth FAR includes that: an external header creates tunnel information indicating the first reference point N3 or the second reference point N9 (including a downlink IP address and downlink GTP-U TED information that correspond to the N3 or N9 interface), and a target interface is an access side; or, corresponding to a device on a DN, the fourth FAR further includes that: an external header creates information indicating the third reference point N6, and a target interface is a core side; or, corresponding to a member connected to an N19 tunnel, the fourth FAR further includes that: an external header creates tunnel information indicating the fourth reference point N19 (including an IP address and GTP-U TED information of a peer PSA UPF that correspond to the N19 interface), and a target interface is a core side.

Fifth PDR and Fifth FAR

An SMF configures a fifth PDR and a fifth FAR that correspond to a group-level session to a UPF that has a need in a multicast group, so that the UPF processes a multicast data packet received from the third reference point N6.

The fifth PDR and the fifth FAR that correspond to the group-level session are specified in the UPF. When detecting, by using the fifth PDR, that the multicast data packet is multicast data from the second internal multicast interface, the UPF transmits, by using the fifth FAR, the multicast data packet from the first reference point N3 or the second reference point N9 corresponding to each local multicast group member in the UPF to all local multicast group members in the UPF, as shown in FIG. 9.

To detect traffic, the fifth PDR includes that: a source interface is set to the second internal multicast interface, and a target address is a second multicast address list, where the second multicast address list is a multicast address list corresponding to another multicast group member connected to a local multicast group member through the third reference point N6.

To forward traffic, the fifth FAR includes that: an external header creates tunnel information indicating the first reference point N3 or the second reference point N9 (including a downlink IP address and downlink GTP-U TEID information that correspond to the N3 or N9 interface), and a target interface is an access side.

Sixth PDR and Sixth FAR

An SMF configures a sixth PDR and a sixth FAR that correspond to a group-level session to a UPF that has a need in a multicast group, so that the UPF processes a multicast data packet received from the fourth reference point N19.

The sixth PDR and the sixth FAR that correspond to the group-level session are specified in the UPF. When detecting, by using the sixth PDR, that the multicast data packet is multicast data from the second internal multicast interface, the UPF transmits, by using the sixth FAR, the multicast data packet from the first reference point N3 or the second reference point N9 corresponding to each local multicast group member in the UPF to all local multicast group members in the UPF, as shown in FIG. 9.

To detect traffic, the sixth PDR includes that: a source interface is set to the second internal multicast interface, and a target address is a third multicast address list, where the third multicast address list is a multicast address list corresponding to another multicast group member connected to a local multicast group member through the fourth reference point N19.

To forward traffic, the sixth FAR includes that: an external header creates tunnel information indicating the first reference point N3 or the second reference point N9 (including a downlink IP address and downlink GTP-U TEID information that correspond to the N3 or N9 interface), and a target interface is an access side.

Figure 10:
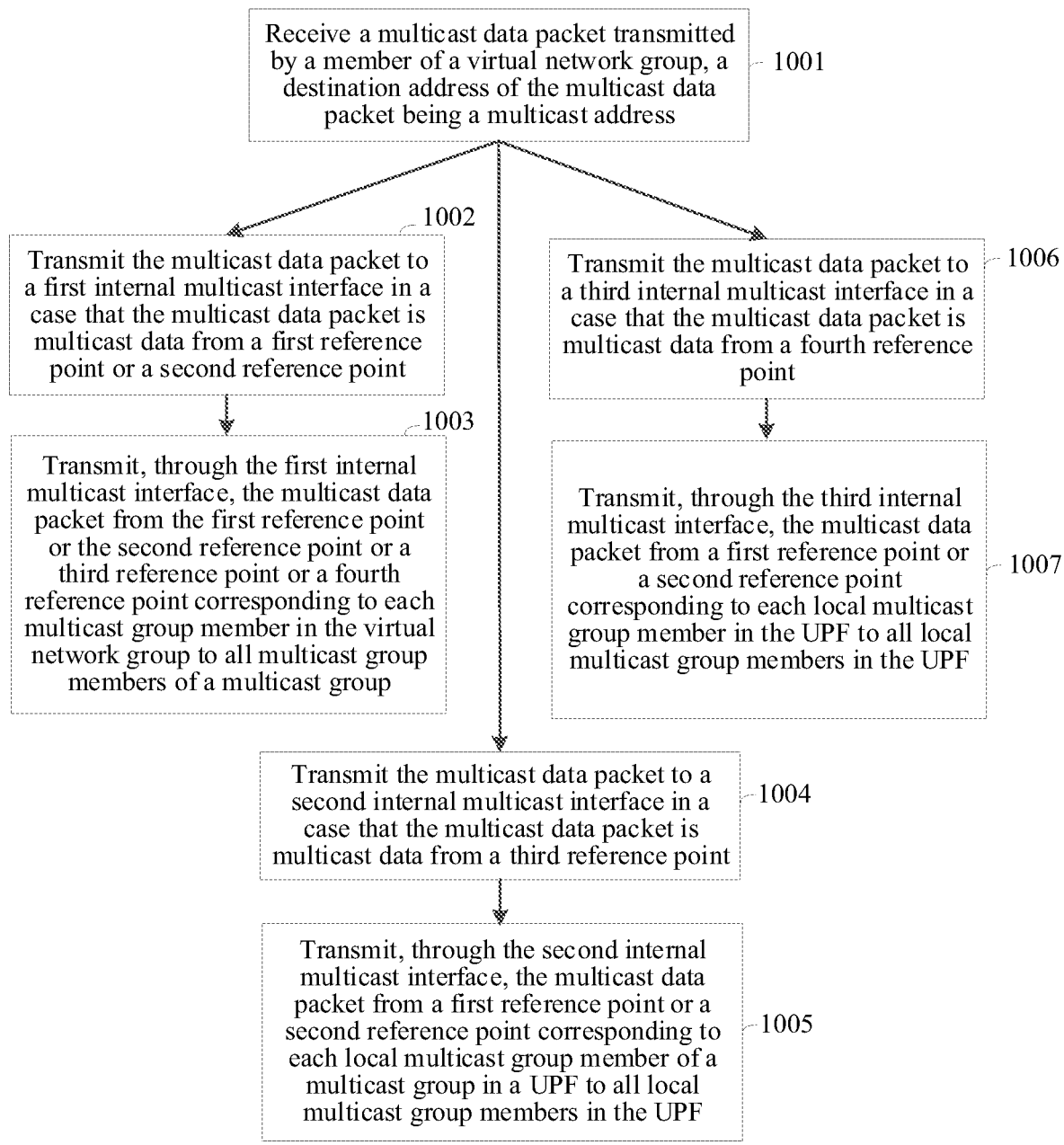
FIG. 10 is a flowchart of a multicast method for a virtual network group according to an example embodiment of the disclosure.

For a Second Implementation of a Conventional Multicast Group:

FIG. 10 shows a flowchart of a multicast method for a multicast group of a virtual network group according to an example embodiment of the disclosure. The method may be performed by a first UPF, and the method includes the following steps:

Step 1001: The first UPF receives a multicast data packet transmitted by a member of a virtual network group, a destination address of the multicast data packet being a multicast address.

It is assumed that the member transmitting the multicast data packet is member A, and member A may be any member of the virtual network group. Member A may be a multicast group member of a multicast group, or may not be a multicast group member of a multicast group. The same member may be connected to one multicast group or a plurality of multicast groups. In this embodiment, an example in which member A is connected to a multicast group member of a multicast group is used for description.

When the multicast group member A is connected to a plurality of multicast groups, and each multicast group corresponds to one multicast address, the destination address of the multicast data packet is one multicast address of a plurality of multicast addresses.

When the multicast group member A is a local multicast group member in the first UPF, the first UPF receives the multicast data packet of the multicast group member A through N3 or N9. When the multicast group member A is a non-local multicast group member in the first UPF, the first UPF receives the multicast data packet of the multicast group member A through N6 or N19.

Step 1002: The first UPF transmits the multicast data packet to a first internal multicast interface when the multicast data packet is multicast data from a first reference point or a second reference point.

When receiving a multicast data packet transmitted by a local multicast group member through N3 or N9, the first UPF transmits the multicast data packet to the first internal multicast interface.

Step 1003: The first UPF transmits, through the first internal multicast interface, the multicast data packet from the first reference point or the second reference point or a third reference point or a fourth reference point corresponding to each multicast group member of a multicast group to all multicast group members of the multicast group.

When a multicast group member B is a member connected to the same PSA UPF as the multicast group member A, the first internal multicast interface transmits the multicast data packet to the multicast group member B through N3 or N9 corresponding to the multicast group member B. When a multicast group member C is a device on a DN, the first internal multicast interface transmits the multicast data packet to member C through N6 corresponding to the multicast group member C. When a multicast group member D is a member connected to a different PSA UPF from the multicast group member A, the first internal multicast interface transmits the multicast data packet to PSA UPF2 connected to the multicast group member D through N19 corresponding to the multicast group member D, and PSA UPF2 transmits the multicast data packet to a second internal multicast interface, and the second internal multicast interface transmits the multicast data packet from N3 to the multicast group member D, as shown in FIG. 8.

"All multicast group members" in this step may include the member that transmits the multicast data packet, or may not include the member that transmits the multicast data packet.

Step 1004: The first UPF transmits the multicast data packet to a second internal multicast interface when the multicast data packet is multicast data from a third reference point.

When receiving a multicast data packet transmitted by a non-local multicast group member through N6, the first UPF transmits the multicast data packet to the second internal multicast interface.

Step 1005: The first UPF transmits, through the second internal multicast interface, the multicast data packet from a first reference point or a second reference point corresponding to each local multicast group member of the multicast group in the first UPF to all local multicast group members in the first UPF.

In an example shown in FIG. 8, when the multicast group member C transmits a multicast data packet, PSA UPF1 receives the multicast data packet from N6, places the multicast data packet into a second internal multicast interface thereof, transmits the multicast data packet to the multicast group member A through the second internal multicast interface and N9 corresponding to the multicast group member A, and transmits the multicast data packet to the multicast group member B through N9 corresponding to the multicast group member B. PSA UPF2 also receives the multicast data packet from N6, places the multicast data packet into a second internal multicast interface thereof, and transmits the multicast data packet to the multicast group member D through the second internal multicast interface and N3 corresponding to the multicast group member D. In this way, the multicast data packet transmitted by the multicast group member C is transmitted to all multicast group members.

Step 1006: The first UPF transmits the multicast data packet to a third internal multicast interface when the multicast data packet is multicast data from a fourth reference point.

When receiving a multicast data packet transmitted by a non-local multicast group member through N19, the UPF transmits the multicast data packet to the third internal multicast interface.

Step 1007: The first UPF transmits, through the third internal multicast interface, the multicast data packet from a first reference point or a second reference point corresponding to each local multicast group member in the first UPF to all local multicast group members in the first UPF.

In another example shown in FIG. 8, when the multicast group member A transmits a multicast data packet, PSA UPF1 receives the multicast data packet from N9, places the multicast data packet into a first internal multicast interface thereof, transmits the multicast data packet from the N9 interface corresponding to the multicast group member B to the multicast group member B through the first internal multicast interface (or PSA UPF1 may transmit the data from the N9 interface to the multicast group member A itself according to network configuration), transmits the multicast data packet from the N6 interface to the multicast group member C of the DN, and transmits the multicast data packet from the N19 interface to PSA UPF2. PSA UPF2 receives the multicast data packet from N19, places the multicast data packet into a third internal multicast interface thereof, and transmits the multicast data packet to the local multicast group member D through the third internal multicast interface and the N3 interface. In this way, the multicast data packet transmitted by the multicast group member A is transmitted to all multicast group members.

In conclusion, according to the method provided in this embodiment, with a first internal multicast interface being provided in a UPF, when a multicast data packet of a local multicast group member is received, the multicast data packet of the local multicast group member is first transmitted to the first internal multicast interface, and then is transmitted to all multicast group members of a multicast group through the first internal multicast interface, so that multicast communication of the multicast group may be implemented.

According to the method provided in this embodiment, with a second internal multicast interface being provided in a UPF, when a multicast data packet of a non-local multicast group member is received from N6, the multicast data packet of the non-local multicast group member is first transmitted to a second internal multicast interface, and then is transmitted to all local multicast group members of a multicast group in the current UPF through the second internal multicast interface, so that multicast communication in a multicast group may be implemented, unnecessary traffic forwarding may be avoided, and network transmission resources may be saved.

According to the method provided in this embodiment, with a third internal multicast interface being provided in a UPF, when a multicast data packet of a non-local multicast group member is received from N19, the multicast data packet of the non-local multicast group member is first transmitted to the third internal multicast interface, and then is transmitted to all local multicast group members of a multicast group in the current UPF through the third internal multicast interface, so that multicast communication in a multicast group may be implemented, unnecessary traffic forwarding may be avoided, and network transmission resources may be saved.

In an example embodiment based on FIG. 10, an implementation process of multicast traffic forwarding in a multicast group is as follows: For each UPF in the multicast group, at least two internal multicast interfaces in the UPF are used. Two steps are used for detecting multicast data packet forwarding between internal multicast interfaces of each UPF.

In a first step, a PDR installed in the UPF detects a multicast data packet received from a member in any multicast group (through N3, N9, N6, or N19). When the multicast data packet matches the PDR, an FAR in the UPF is applied to forward the multicast data packet to an internal multicast interface of the UPF, that is, a destination interface specified for the internal multicast interface.

In a second step, a PDR installed in the internal multicast interface of the UPF detects the multicast data packet. After the multicast data packet matches the PDR, an FAR in the internal multicast interface is applied to forward the multicast data packet to all multicast group members or all local multicast group members of the multicast group through N3, N6, N9, or N19.

Therefore, for each UPF in the multicast group, an N4 rule (that is, a PDR and an FAR) is configured, and an example configuration of the PDR and the FAR is as follows:

First PDR and First FAR

An SMF provides a first PDR and a first FAR for an N4 session of each multicast group member of the multicast group (that is, an N4 session corresponding to a PDU session of each member), so that the UPF processes a multicast data packet received from the UE.

For each UPF in the multicast group, a first PDR and a first FAR that correspond to each local multicast group member are specified in the UPF. When detecting, by using the first PDR, that the multicast data packet is multicast data from the first reference point N3 or the second reference point N9, the UPF transmits the multicast data packet to the first internal multicast interface by using the first FAR, as shown in FIG. 9.

To detect traffic, the first PDR includes that: a source interface is set to an access side, a target address is set to a first multicast address list to which a multicast group member belongs, and core network tunnel information is set to a tunnel header of a first reference point or a second reference point of a PDU session (including an uplink IP address and uplink GTP-U TED information that correspond to the N3 or N9 interface).

To forward traffic, the first FAR includes that: a target interface is set to the first internal multicast interface.

The multicast address in the multicast data packet is a multicast address in the first multicast address list.

Second PDR and Second FAR

An SMF configures a second PDR and a second FAR that correspond to a group-level session to a UPF that has a need, so that the UPF processes a multicast data packet received through N6. The group-level session is a session shared by all multicast group members in a multicast group. The group-level session is a session between the UPF and the SMF, that is, a group-level N4 session.

For a UPF that has a need in a multicast group, a second PDR and a second FAR that correspond to a group-level session are specified in the UPF. When it is detected by using the second PDR that the multicast data packet is multicast data from the third reference point N6, the multicast data packet is transmitted to the second internal multicast interface by using the second FAR, as shown in FIG. 9.

To detect traffic, the second PDR includes that: a source interface is set to a core side, and a target address is set to a second multicast address list, where the second multicast address list is a multicast address list corresponding to another multicast group member connected to a local multicast group member through the third reference point N6.

To forward traffic, the second FAR includes that: a target interface is set to the second internal multicast interface.

Seventh PDR and Seventh FAR

An SMF configures a seventh PDR and a seventh FAR that correspond to a group-level session to a UPF that has a need, so that the UPF processes a multicast data packet received through N19.

Figure 11:
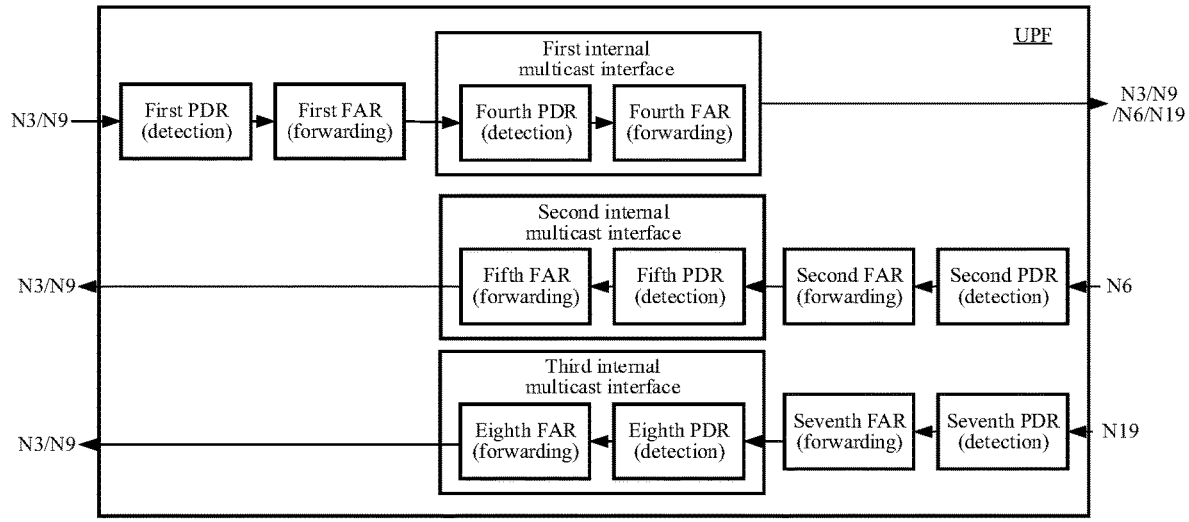
FIG. 11 is a schematic diagram of rule configuration of three internal multicast interfaces according to an example embodiment of the disclosure.

For a UPF that has a need in a multicast group, a seventh PDR and a seventh FAR that correspond to a group-level session are specified in the UPF. When it is detected by using the seventh PDR that the multicast data packet is multicast data from the fourth reference point N19, the multicast data packet is transmitted to the third internal multicast interface by using the seventh FAR, as shown in FIG. 11.

To detect traffic, the seventh PDR includes that: a source interface is set to a core side, a target address is set to a third multicast address list, and core network tunnel information is set to a tunnel header of the fourth reference point (including an IP address and GTP-U TED information that correspond to the N19 interface), where the third multicast address list is a multicast address list corresponding to another multicast group member connected to a local multicast group member through the fourth reference point N19.

To forward traffic, the seventh FAR includes that: a target interface is set to the third internal multicast interface.

Fourth PDR and Fourth FAR

An SMF provides a fourth PDR and a fourth FAR for an N4 session of each multicast group member of the multicast group (that is, an N4 session corresponding to a PDU session of each member), so that the UPF processes a multicast data packet received from the UE.

For a UPF that has a need in a multicast group, a fourth PDR and a fourth FAR that correspond to each local multicast group member are specified in the UPF. When detecting, by using the fourth PDR, that the multicast data packet is multicast data from the first internal multicast interface, the UPF transmits, by using the fourth FAR, the multicast data packet from the first reference point or the second reference point or the third reference point or the fourth reference point corresponding to each multicast group member of a multicast group to all multicast group members of the multicast group, as shown in FIG. 9.

To detect traffic, the fourth PDR includes that: a source interface is set to the first internal multicast interface, and a target address is a first multicast address list to which a multicast group member belongs.

To forward traffic, corresponding to a local multicast group member, the fourth FAR includes that: an external header creates tunnel information indicating the first reference point N3 or the second reference point N9 (including a downlink IP address and downlink GTP-U TED information that correspond to the N3 or N9 interface), and a target interface is an access side; or, corresponding to a device on a DN, the fourth FAR further includes that: an external header creates information indicating the third reference point N6, and a target interface is a core side; or, corresponding to a member connected to an N19 tunnel, the fourth FAR further includes that: an external header creates tunnel information indicating the fourth reference point N19 (including an IP address and GTP-U TED information that correspond to the N19 interface), and a target interface is a core side.

Fifth PDR and Fifth FAR

An SMF configures a fifth PDR and a fifth FAR that correspond to a group-level session to a UPF that has a need in a multicast group, so that the UPF processes a multicast data packet received from N6.

The fifth PDR and the fifth FAR that correspond to the group-level session are specified in the UPF. When detecting, by using the fifth PDR, that the multicast data packet is multicast data from the second internal multicast interface, the UPF transmits, by using the fifth FAR, the multicast data packet from the first reference point N3 or the second reference point N9 corresponding to each local multicast group member in the UPF to all local multicast group members in the UPF, as shown in FIG. 9.

To detect traffic, the fifth PDR includes that: a source interface is set to the second internal multicast interface, and a target address is a second multicast address list, where the second multicast address list is a multicast address list corresponding to another multicast group member connected to a local multicast group member through the third reference point N6.

To forward traffic, the fifth FAR includes that: an external header creates tunnel information indicating the first reference point N3 or the second reference point N9 (including a downlink IP address and downlink GTP-U TEID information that correspond to the N3 or N9 interface), and a target interface is an access side.

Eighth PDR and Eighth FAR

An SMF configures an eighth PDR and an eighth FAR that correspond to a group-level session to a UPF that has a need in a multicast group, so that the UPF processes a multicast data packet received from N19.

The eighth PDR and the eighth FAR that correspond to the group-level session are specified in the UPF. When detecting, by using the eighth PDR, that the multicast data packet is multicast data from the third internal multicast interface, the UPF transmits, by using the eighth FAR, the multicast data packet from the first reference point N3 or the second reference point N9 corresponding to each local multicast group member in the UPF to all local multicast group members in the UPF, as shown in FIG. 11.

To detect traffic, the eighth PDR includes that: a source interface is set to the third internal multicast interface, and a target address is a third multicast address list, where the third multicast address list is a multicast address list corresponding to another multicast group member connected to a local multicast group member through the fourth reference point N19.

To forward traffic, the eighth FAR includes that: an external header creates tunnel information indicating the first reference point N3 or the second reference point N9 (including a downlink IP address and downlink GTP-U TEID information that correspond to the N3 or N9 interface), and a target interface is an access side.

In an embodiment, the first multicast address list is all multicast addresses of multicast groups to which a multicast group member belongs.

In an embodiment, the second multicast address list is a set of multicast address lists of multicast groups to which all local multicast group members in the first UPF belong.

In an embodiment, the third multicast address list is an intersection set of a multicast address list of multicast groups to which local multicast group members in the first UPF belong and a multicast address list of multicast groups to which local multicast group members of a second UPF belong, and the second UPF is connected to the first UPF through the fourth reference point.

For a Third Implementation of a Conventional Multicast Group:

The multicast address lists (the first multicast address list, the second multicast address list, and the third multicast address list) in the PDR and the FAR include a plurality of multicast addresses, for example, three multicast addresses or five multicast addresses.

When there are m multicast addresses in the multicast address list, at least one of the first internal multicast interface, the second internal multicast interface, and the third internal multicast interface may be implemented as m internal multicast interfaces, and each internal multicast interface corresponds to one multicast address; m being a positive integer, and i being an integer not greater than m.

When the first internal multicast interface is implemented as m first internal multicast interfaces, an $i^{th}$ first internal multicast interface corresponds to an $i^{th}$ multicast address in the first multicast address list, and it is assumed that the multicast address in the multicast data packet is the $i^{th}$ multicast address.

The first PDR includes that: a source interface is set to an access side, a target address is set to the $i^{th}$ multicast address in the first multicast address list, and core network tunnel information is set to a tunnel header of a first reference point or a second reference point of a PDU session; and the first FAR includes that: a target interface is set to the $i^{th}$ first internal multicast interface.

The fourth PDR includes that: a source interface is set to the $i^{th}$ first internal multicast interface, and a target address is the $i^{th}$ multicast address in the first multicast address list; and the fourth FAR includes that: an external header creates tunnel information indicating the first reference point or the second reference point, and a target interface is an access side; or, the fourth FAR further includes that: an external header creates tunnel information indicating a third reference point, and a target interface is a core side; or, the fourth FAR further includes that: an external header creates tunnel information indicating a fourth reference point, and a target interface is a core side.

When the second internal multicast interface is implemented as m second internal multicast interfaces, an $i^{th}$ second internal multicast interface corresponds to an $i^{th}$ multicast address in the second multicast address list, and it is assumed that the multicast address in the multicast data packet is the $i^{th}$ multicast address.

The second PDR includes that: a source interface is set to a core side, and a target address is set to the $i^{th}$ multicast address; and the second FAR includes that: a target interface is set to the $i^{th}$ second internal multicast interface.

The fifth PDR includes that: a source interface is set to the $i^{th}$ second internal multicast interface, and a target address is the $i^{th}$ multicast address in the second multicast address list; and the fifth FAR includes that: an external header creates tunnel information indicating the first reference point or the second reference point, and a target interface is an access side.

The third PDR includes that: a source interface is set to a core side, a target address is set to an $i^{th}$ multicast address in the third multicast address list, and core network tunnel information is set to a tunnel header of the fourth reference point; and the third FAR includes that: a target interface is set to the $i^{th}$ second internal multicast interface, m being a positive integer, and i being an integer not greater than m.

The sixth PDR includes that: a source interface is set to the $i^{th}$ second internal multicast interface, and a target address is the $i^{th}$ multicast address in the third multicast address list; and the fifth FAR includes that: an external header creates tunnel information indicating the first reference point or the second reference point, and a target interface is an access side.

When the third internal multicast interface is implemented as m third internal multicast interfaces, an $i^{th}$ third internal multicast interface corresponds to an $i^{th}$ multicast address in the third multicast address list, and it is assumed that the multicast address in the multicast data packet is the $i^{th}$ multicast address.

The seventh PDR includes that: a source interface is set to a core side, a target address is set to the $i^{th}$ multicast address in the third multicast address list, and core network tunnel information is set to a tunnel header of the fourth reference point; and the seventh FAR includes that: a target interface is set to the $i^{th}$ third internal multicast interface.

The eighth PDR includes that: a source interface is set to the $i^{th}$ third internal multicast interface, and a target address is the $i^{th}$ multicast address; and the eighth FAR includes that: an external header creates tunnel information indicating the first reference point or the second reference point, and a target interface is an access side.

For example, the at least two internal multicast interfaces include the first internal multicast interface and m second internal multicast interfaces. Each second internal multicast interface corresponds to one multicast address, and m is a quantity of multicast addresses.

The first UPF transmits, when the multicast data packet is multicast data from the first reference point or the second reference point, the multicast data packet to the first internal multicast interface, and transmits, through the first internal multicast interface, the multicast data packet from the first reference point or the second reference point or the third reference point or the fourth reference point corresponding to each multicast group member of the multicast group to all the multicast group members of the multicast group.

The first UPF transmits, when the multicast data packet is multicast data from the third reference point or the fourth reference point and a multicast address of the multicast data packet is an $i^{th}$ multicast address, the multicast data packet to the second internal multicast interface corresponding to the $i^{th}$ multicast address, and transmits the multicast data packet from the first reference point or the second reference point corresponding to each local multicast group member in the first UPF to all local multicast group members in the first UPF through the second internal multicast interface corresponding to the $i^{th}$ multicast address.

An embodiment of m first internal multicast interfaces or an embodiment of m third internal multicast interfaces is easily conceived by a person skilled in the art according to the foregoing embodiments, and is not described one by one.

Figure 12:
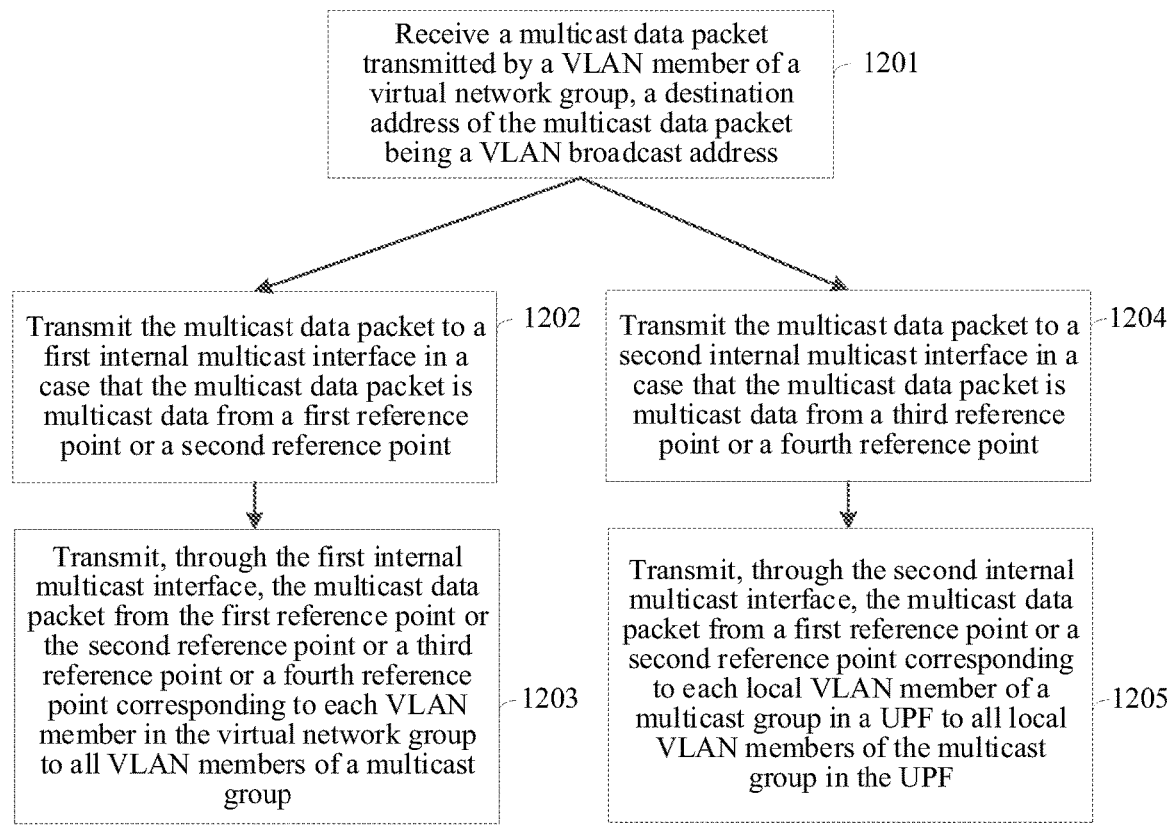
FIG. 12 is a flowchart of a multicast method for a virtual network group according to an example embodiment of the disclosure.

For a First Implementation of a VID:

FIG. 12 shows a flowchart of a multicast method for a VID of a virtual network group according to an example embodiment of the disclosure. The method may be performed by a first UPF, and the method includes the following steps:

Step 1201: The first UPF receives a multicast data packet transmitted by a member (or VLAN member) of a virtual network group, a destination address of the multicast data packet being a VID and a broadcast address.

It is assumed that the member transmitting the multicast data packet is member A, and member A may be any member of the virtual network group. The same member may be connected to one or more VIDs.

When member A is connected to a plurality of VIDs, and each VID corresponds to one or more broadcast addresses, a destination address of each multicast data packet is one of the plurality of broadcast addresses.

When member A is a local VID member in the first UPF, the first UPF receives the multicast data packet of member A through N3 or N9. When member A is a non-local VID member in the first UPF, the first UPF receives the multicast data packet of member A through N6 or N19.

Step 1202: The first UPF transmits the multicast data packet to a first internal multicast interface when the multicast data packet is multicast data from a first reference point or a second reference point.

When receiving a multicast data packet transmitted by a local VID member through N3 or N9, the UPF transmits the multicast data packet to the first internal multicast interface.

Step 1203: The first UPF transmits, through the first internal multicast interface, the multicast data packet from the first reference point or the second reference point or a third reference point or a fourth reference point corresponding to each VID member of a VID to all VID members of the VID.

For example, member A, member B, member C, and member D belong to the same VID. When VID member B is a member connected to the same PSA UPF as the VID member A, the first internal multicast interface transmits the multicast data packet to VID member B through N3 or N9 corresponding to the VID member B. When VID member C is a device on a DN, the first internal multicast interface transmits the multicast data packet to VID member C through N6 corresponding to the VID member C. When VID member D is a member connected to a different PSA UPF from the VID member A, the first internal multicast interface transmits the multicast data packet to VID member D through N19 corresponding to the VID member D, as shown in FIG. 8.

"All VID members" in this step may include the member that transmits the multicast data packet, or may not include the member that transmits the multicast data packet.

Step 1204: The first UPF transmits the multicast data packet to a second internal multicast interface when the multicast data packet is multicast data from the third reference point or the fourth reference point.

When receiving a multicast data packet transmitted by a non-local VID member through N6 or N19, the first UPF transmits the multicast data packet to the second internal multicast interface.

Step 1205: transmit, through the second internal multicast interface, the multicast data packet from the first reference point or the second reference point corresponding to each local VID member in the first UPF to all local VID members in the first UPF.

In an example shown in FIG. 8, when VID member C transmits a multicast data packet, PSA UPF1 receives the multicast data packet from N6, places the multicast data packet into a second internal multicast interface thereof, transmits the multicast data packet to VID member A through the second internal multicast interface and N9 corresponding to the VID member A, and transmits the multicast data packet to VID member B through N9 corresponding to the VID member B. PSA UPF2 also receives the multicast data packet from N6, places the multicast data packet into a second internal multicast interface thereof, and transmits the multicast data packet to member D through the second internal multicast interface and N3 corresponding to member D. In this way, the multicast data packet transmitted by VID member C is transmitted to all VID members.

In another example shown in FIG. 8, when VID member A transmits a multicast data packet, PSA UPF1 receives the multicast data packet from N9, places the multicast data packet into a first internal multicast interface thereof, transmits the multicast data packet from N6 corresponding to VID member C to VID member C through the first internal multicast interface, and transmits the multicast data packet from N9 corresponding to VID member B to VID member B through the first internal multicast interface (PSA UPF1 may also transmit the multicast data packet from N9 to PSA UPF2 according to network configuration). PSA UPF2 receives the multicast data packet from N19, and places the multicast data packet into a second internal multicast interface thereof, and transmits the multicast data packet to the local VID member D through the second internal multicast interface and N3. In this way, the multicast data packet transmitted by VID member A is transmitted to all VID members.

In conclusion, according to the method provided in this embodiment, with a first internal multicast interface being provided in a UPF, when a multicast data packet of a local VID member is received, the multicast data packet of the local VID member is first transmitted to the first internal multicast interface, and then is transmitted to all VID members of a VID through the first internal multicast interface (in a path other than the current UPF, a second internal multicast interface or a third internal multicast interface of another UPF may be further required to transmit the multicast data packet to all the VID members of the VID), so that multicast communication in the VID may be implemented.

According to the method provided in this embodiment, with a second internal multicast interface being provided in a UPF, when a multicast data packet of a non-local VID member is received, the multicast data packet of the non-local VID member is first transmitted to the second internal multicast interface, and then is transmitted to all local VID members connected to the UPF through the second internal multicast interface, so that multicast communication in a VID may be implemented, unnecessary traffic forwarding may be avoided, and network transmission resources may be saved.

In an example embodiment based on FIG. 12, an implementation process of multicast traffic forwarding in a VID is as follows: For each UPF in the VID, at least two internal multicast interfaces in the UPF are used. Two steps are used for detecting multicast data packet forwarding between internal multicast interfaces of each UPF.

In a first step, a PDR installed in the UPF detects a multicast data packet received from a member in any VID (through N3, N9, N6, or N19). After the multicast data packet matches the PDR, an FAR in the UPF is applied to forward the multicast data packet to an internal multicast interface of the UPF, that is, a destination interface specified for the internal multicast interface.

In a second step, a PDR installed in the internal multicast interface of the UPF detects the multicast data packet. After the multicast data packet matches the PDR, a corresponding FAR in the internal multicast interface is applied to forward the multicast data packet to all members in the VID through N3, N6, N9, or N19.

Therefore, for each UPF in the VID, an N4 rule (that is, a PDR and an FAR) is configured, and an example configuration of the PDR and the FAR is as follows:

First PDR and First FAR

An SMF provides a first PDR and a first FAR for an N4 session of each VID member in the VID (that is, an N4 session corresponding to a PDU session of each member), so that the UPF processes a multicast data packet received from the UE.

For each UPF in the VID, a first PDR and a first FAR that correspond to each local VID member are specified in the UPF. When detecting, by using the first PDR, that the multicast data packet is multicast data from the first reference point N3 or the second reference point N9, the UPF transmits the multicast data packet to the first internal multicast interface by using the first FAR, as shown in FIG. 9.

To detect traffic, the first PDR includes that: a source interface is set to an access side, a target address is set to a first VID list to which a VID member belongs and a broadcast address, and core network tunnel information is set to a tunnel header of the first reference point N3 or the second reference point N9 of a PDU session (including an uplink IP address and uplink GTP-U TED information that correspond to the N3 or N9 interface).

To forward traffic, the first FAR includes that: a target interface is set to the first internal multicast interface.

The multicast address in the multicast data packet is a VID in the first VID list to which the VID member belongs, and the broadcast address.

Second PDR and Second FAR

An SMF configures a second PDR and a second FAR that correspond to a group-level session to a UPF that has a need, so that the UPF processes a multicast data packet received through N6. The group-level session is a session shared by all VID members in a VID. The group-level session is a session between the UPF and the SMF, that is, a group-level N4 session.

For a UPF that has a need in a VID, a second PDR and a second FAR that correspond to a group-level session are specified in the UPF. When it is detected by using the second PDR that the multicast data packet is multicast data from the third reference point N6, the multicast data packet is transmitted to the second internal multicast interface by using the second FAR, as shown in FIG. 9.

To detect traffic, the second PDR includes that: a source interface is set to a core side, a target address is set to a second VID list and a broadcast address, where the second VID list is a VID list corresponding to another VID member connected to a local VID member through the third reference point N6.

To forward traffic, the second FAR includes that: a target interface is set to the second internal multicast interface.

The second VID list is a VID list of all VIDs in the virtual network group; or the second VID list is a set of VID lists to which all local VID members in the first UPF belong.

Third PDR and Third FAR

An SMF configures a third PDR and a third FAR that correspond to a group-level session to a UPF that has a need, so that the UPF processes a multicast data packet received through N19.

For a UPF that has a need in a VID, a third PDR and a third FAR that correspond to a group-level session are specified in the UPF. When it is detected by using the third PDR that the multicast data packet is multicast data from the fourth reference point N19, the multicast data packet is transmitted to the third internal multicast interface by using the third FAR, as shown in FIG. 9.

To detect traffic, the third PDR includes that: a source interface is set to a core side, a target address is set to a third VID list and a broadcast address, and core network tunnel information is set to a tunnel header of the fourth reference point (including a receive IP address and receive GTP-U TEID information that correspond to the N19 interface), where the third VID list is a VID list corresponding to another VID member connected to a local VID member through the fourth reference point N19.

To forward traffic, the third FAR includes that: a target interface is set to the second internal multicast interface.

Fourth PDR and Fourth FAR

An SMF provides a fourth PDR and a fourth FAR for an N4 session of each VID member of the VID (that is, an N4 session corresponding to a PDU session of each member), so that the UPF processes a multicast data packet received from the UE.

For a UPF that has a need in a VID, a fourth PDR and a fourth FAR that correspond to a local VID member are specified in the UPF. When detecting, by using the fourth PDR, that the multicast data packet is multicast data from the first internal multicast interface, the UPF transmits, by using the fourth FAR, the multicast data packet from the first reference point or the second reference point or the third reference point or the fourth reference point corresponding to each VID member of a VID to all VID members of the VID, as shown in FIG. 9.

To detect traffic, the fourth PDR includes that: a source interface is set to the first internal multicast interface, and a target address is a first VID list to which a VID member belongs and a broadcast address.

To forward traffic, corresponding to a local VID member, the fourth FAR includes that: an external header creates tunnel information indicating the first reference point N3 or the second reference point N9 (including a downlink IP address and downlink GTP-U TED information that correspond to the N3 or N9 interface), and a target interface is an access side; or, corresponding to a device on a DN, the fourth FAR further includes that: an external header creates information indicating the third reference point N6, and a target interface is a core side; or, corresponding to a member connected to an N19 tunnel, the fourth FAR further includes that: an external header creates tunnel information indicating the fourth reference point N19 (including an IP address and GTP-U TED information of a peer PSA UPF that correspond to the N19 interface), and a target interface is a core side.

Fifth PDR and Fifth FAR

An SMF configures a fifth PDR and a fifth FAR that correspond to a group-level session to a UPF that has a need in a VID, so that the UPF processes a multicast data packet received from N6 or N19.

The fifth PDR and the fifth FAR that correspond to the group-level session are specified in the UPF. When detecting, by using the fifth PDR, that the multicast data packet is multicast data from the second internal multicast interface, the UPF transmits, by using the fifth FAR, the multicast data packet from the first reference point N3 or the second reference point N9 corresponding to each local VID member in the UPF to all local VID members in the UPF, as shown in FIG. 9.

To detect traffic, the fifth PDR includes that: a source interface is set to the second internal multicast interface, and a target address is a second VID list of the VID and a broadcast address.

To forward traffic, the fifth FAR includes that: an external header creates tunnel information indicating the first reference point N3 or the second reference point N9 (including a downlink IP address and downlink GTP-U TEID information that correspond to the N3 or N9 interface), and a target interface is an access side.

Sixth PDR and Sixth FAR

An SMF configures a sixth PDR and a sixth FAR that correspond to a group-level session to a UPF that has a need in a VID, so that the UPF processes a multicast data packet received from N19.

The sixth PDR and the sixth FAR that correspond to the group-level session are specified in the UPF. When detecting, by using the sixth PDR, that the multicast data packet is multicast data from the second internal multicast interface, the UPF transmits, by using the sixth FAR, the multicast data packet from the first reference point N3 or the second reference point N9 corresponding to each local VID member in the UPF to all local VID members in the UPF, as shown in FIG. 9.

To detect traffic, the sixth PDR includes that: a source interface is set to the second internal multicast interface, and a target address is a third VID list and a broadcast address, where the third VID list is a VID list corresponding to another VID member connected to a local VID member through the fourth reference point N19.

To forward traffic, the sixth FAR includes that: an external header creates tunnel information indicating the first reference point N3 or the second reference point N9 (including a downlink IP address and downlink GTP-U TEID information that correspond to the N3 or N9 interface), and a target interface is an access side.

Figure 13:
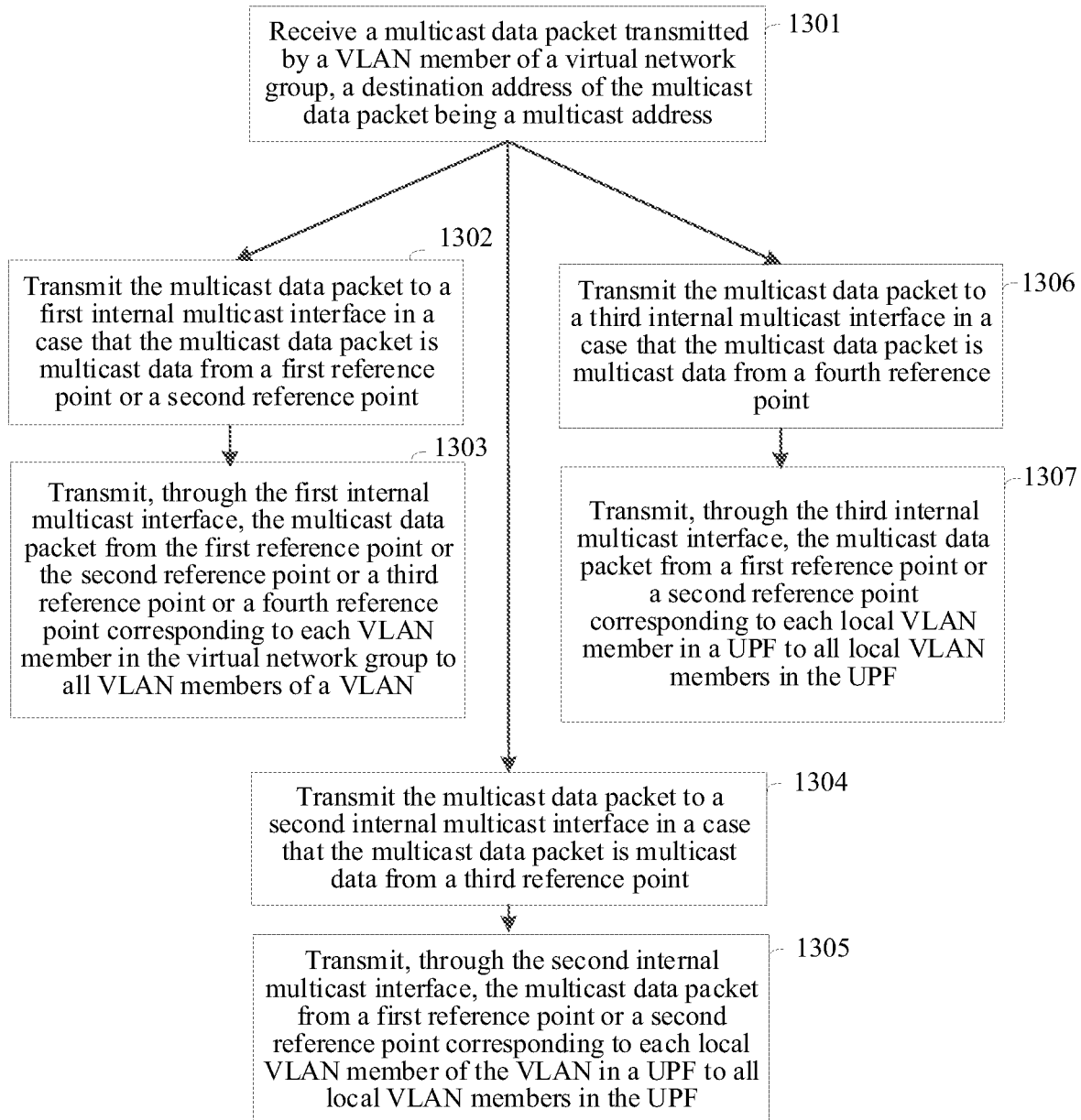
FIG. 13 is a flowchart of a multicast method for a virtual network group according to an example embodiment of the disclosure.

For a Second Implementation of a VID:

FIG. 13 shows a flowchart of a multicast method for a VID of a virtual network group according to an example embodiment of the disclosure. The method may be performed by a first UPF, and the method includes the following steps:

Step 1301: The first UPF receives a multicast data packet transmitted by a member of a virtual network group, a destination address of the multicast data packet being a VID and a broadcast address.

It is assumed that the member transmitting the multicast data packet is member A, and member A may be any member of the virtual network group. Member A may be a VID member of the VID, or may not be a VID member of the VID. The same member may be connected to one or more VIDs. In this embodiment, an example in which member A is connected to a VID member of a VID is used for description.

When VID member A is connected to a plurality of VIDs, and each VID corresponds to one broadcast address, a destination address of a multicast data packet is one of a plurality of broadcast addresses.

When VID member A is a local VID member in the first UPF, the UPF receives the multicast data packet of VID member A through N3 or N9. When VID member A is a non-local VID member in the first UPF, the first UPF receives the multicast data packet of VID member A through N6 or N19.

Step 1302: The first UPF transmits the multicast data packet to a first internal multicast interface when the multicast data packet is multicast data from a first reference point or a second reference point.

When receiving a multicast data packet transmitted by a local VID member through N3 or N9, the first UPF transmits the multicast data packet to the first internal multicast interface.

Step 1303: The first UPF transmits, through the first internal multicast interface, the multicast data packet from the first reference point or the second reference point or a third reference point or a fourth reference point corresponding to each VID member of a VID to all VID members of the VID.

When VID member B is a member connected to the same PSA UPF as the VID member A, the first internal multicast interface transmits the multicast data packet to VID member B through N3 or N9 corresponding to VID member B. When VID member C is a device on a DN, the first internal multicast interface transmits the multicast data packet to VID member C through N6 corresponding to VID member C. When VID member D is a member connected to a different PSA UPF from VID member A, the first internal multicast interface transmits the multicast data packet to PSA UPF2 connected to VID member D through N19 corresponding to VID member D, and PSA UPF2 transmits the multicast data packet to a third internal multicast interface, and the third internal multicast interface transmits the multicast data packet from N3 to VID member D, as shown in FIG. 8.

"All VID members" in this step may include the member that transmits the multicast data packet, or may not include the member that transmits the multicast data packet.

Step 1304: The first UPF transmits the multicast data packet to a second internal multicast interface when the multicast data packet is multicast data from the third reference point.

When receiving a multicast data packet transmitted by a non-local VID member through N6, the first UPF transmits the multicast data packet to the second internal multicast interface.

Step 1305: The first UPF transmits, through the second internal multicast interface, the multicast data packet from a first reference point or a second reference point corresponding to each local VID member of the VID in the first UPF to all local VID members in the first UPF.

In an example shown in FIG. 8, when VID member C transmits a multicast data packet, PSA UPF1 receives the multicast data packet from N6, places the multicast data packet into a second internal multicast interface thereof, transmits the multicast data packet to VID member A through the second internal multicast interface and N9 corresponding to the VID member A, and transmits the multicast data packet to VID member B through N9 corresponding to the VID member B. PSA UPF2 also receives the multicast data packet from N6, places the multicast data packet into a second internal multicast interface thereof, and transmits the multicast data packet to VID member D through the second internal multicast interface thereof and N3 corresponding to VID member D. In this way, the multicast data packet transmitted by VID member C is transmitted to all VID members.

Step 1306: The first UPF transmits the multicast data packet to a third internal multicast interface when the multicast data packet is multicast data from the fourth reference point.

When receiving a multicast data packet transmitted by a non-local VID member through N19, the first UPF transmits the multicast data packet to the third internal multicast interface.

Step 1307: The first UPF transmits, through the third internal multicast interface, the multicast data packet from the first reference point or the second reference point corresponding to each local VID member in the UPF to all local VID members in the first UPF.

In another example shown in FIG. 8, when VID member A transmits a multicast data packet, PSA UPF1 receives the multicast data packet from N9, places the multicast data packet into a first internal multicast interface thereof, transmits the multicast data packet from the N9 interface corresponding to VID member B to VID member B through the first internal multicast interface (or PSA UPF1 may transmit the data from the N9 interface to VID member A itself according to network configuration), transmits the multicast data packet from the N6 interface to VID member C of the DN, and transmits the multicast data packet from the N19 interface to PSA UPF2. PSA UPF2 receives the multicast data packet from N19, places the multicast data packet into a third internal multicast interface thereof, and transmits the multicast data packet to the local VID member D through the third internal multicast interface and the N3 interface. In this way, the multicast data packet transmitted by VID member A is transmitted to all VID members.

In conclusion, according to the method provided in this embodiment, with a first internal multicast interface being provided in a UPF, when a multicast data packet of a local VID member is received, the multicast data packet of the local VID member is first transmitted to the first internal multicast interface, and then is transmitted to all VID members of a VID through the first internal multicast interface, so that multicast communication in the VID may be implemented.

According to the method provided in this embodiment, with a second internal multicast interface being provided in a UPF, when a multicast data packet of a non-local VID member is received from N6, the multicast data packet of the non-local VID member is first transmitted to the second internal multicast interface, and then is transmitted to all local VID members of a VID in the current UPF through the second internal multicast interface, so that multicast communication in a VID may be implemented, unnecessary traffic forwarding may be avoided, and network transmission resources may be saved.

According to the method provided in this embodiment, with a third internal multicast interface being provided in a UPF, when a multicast data packet of a non-local VID member is received from N19, the multicast data packet of the non-local VID member is first transmitted to the third internal multicast interface, and then is transmitted to all local VID members of a VID in the current UPF through the third internal multicast interface, so that multicast communication in a VID may be implemented, unnecessary traffic forwarding may be avoided, and network transmission resources may be saved.

In an example embodiment based on FIG. 13, an implementation process of multicast traffic forwarding in a VID is as follows: For each UPF in the VID, at least two internal multicast interfaces in the UPF are used. Two steps are used for detecting multicast data packet forwarding between internal multicast interfaces of each UPF.

In a first step, a PDR installed in the UPF detects a multicast data packet received from a member in any VID (through N3, N9, N6, or N19). When the multicast data packet matches the PDR, an FAR in the UPF is applied to forward the multicast data packet to an internal multicast interface of the UPF, that is, a destination interface specified for the internal multicast interface.

In a second step, a PDR installed in the internal multicast interface of the UPF detects the multicast data packet. After the multicast data packet matches the PDR, an FAR in the internal multicast interface is applied to forward the multicast data packet to a VID member in the VID through N3, N6, N9, or N19.

Therefore, for each UPF in the VID, an N4 rule (that is, a PDR and an FAR) is configured, and an example configuration of the PDR and the FAR is as follows:

First PDR and First FAR

An SMF provides a first PDR and a first FAR for an N4 session of each VID member in the VID (that is, an N4 session corresponding to a PDU session of each member), so that the UPF processes a multicast data packet received from the UE.

For each UPF in the VID, a first PDR and a first FAR that correspond to each local VID member are specified in the UPF. When detecting, by using the first PDR, that the multicast data packet is multicast data from the first reference point N3 or the second reference point N9, the UPF transmits the multicast data packet to the first internal multicast interface by using the first FAR, as shown in FIG. 9.

To detect traffic, the first PDR includes that: a source interface is set to an access side, a target address is set to a first VID list to which a VID member belongs and a broadcast address, and core network tunnel information is set to a tunnel header of a first reference point or a second reference point of a PDU session (including an uplink IP address and uplink GTP-U TED information that correspond to the N3 or N9 interface).

To forward traffic, the first FAR includes that: a target interface is set to the first internal multicast interface.

A multicast address in the multicast data packet is a VID in a VID list to which the VID belongs and a broadcast address in broadcast addresses.

Second PDR and Second FAR

An SMF configures a second PDR and a second FAR that correspond to a group-level session to a UPF that has a need, so that the UPF processes a multicast data packet received through N6. The group-level session is a session shared by all VID members in a VID. The group-level session is a session between the UPF and the SMF, that is, a group-level N4 session.

For a UPF that has a need in a VID, a second PDR and a second FAR that correspond to a group-level session are specified in the UPF. When it is detected by using the second PDR that the multicast data packet is multicast data from the third reference point N6, the multicast data packet is transmitted to the second internal multicast interface by using the second FAR, as shown in FIG. 9.

To detect traffic, the second PDR includes that: a source interface is set to a core side, and a target address is set to a second VID list of the VID and a broadcast address.

To forward traffic, the second FAR includes that: a target interface is set to the second internal multicast interface.

The second multicast address list is a VID list of all VIDs in the virtual network group and a broadcast address; or the second multicast address list is a VID list to which all local VID members in the first UPF belong and a set of broadcast addresses.

Seventh PDR and Seventh FAR

An SMF configures a seventh PDR and a seventh FAR that correspond to a group-level session to a UPF that has a need, so that the UPF processes a multicast data packet received through N19.

For a UPF that has a need in a VID, a seventh PDR and a seventh FAR that correspond to a group-level session are specified in the UPF. When it is detected by using the seventh PDR that the multicast data packet is multicast data from the fourth reference point N19, the multicast data packet is transmitted to the third internal multicast interface by using the seventh FAR, as shown in FIG. 11.

To detect traffic, the third PDR includes that: a source interface is set to a core side, a target address is set to a third VID list and a broadcast address, and core network tunnel information is set to a tunnel header of the fourth reference point (including an IP address and GTP-U TED information that correspond to the N19 interface).

To forward traffic, the third FAR includes that: a target interface is set to the third internal multicast interface.

Fourth PDR and Fourth FAR

An SMF provides a fourth PDR and a fourth FAR for an N4 session of each VID member of the VID (that is, an N4 session corresponding to a PDU session of each member), so that the UPF processes a multicast data packet received from the UE.

For a UPF that has a need in a VID, a fourth PDR and a fourth FAR that correspond to a local VID member are specified in the UPF. When detecting, by using the fourth PDR, that the multicast data packet is multicast data from the first internal multicast interface, the UPF transmits, by using the fourth FAR, the multicast data packet from the first reference point or the second reference point or the third reference point or the fourth reference point corresponding to each VID member of a VID to all VID members of the VID, as shown in FIG. 11.

To detect traffic, the fourth PDR includes that: a source interface is set to the first internal multicast interface, and a target address is a first VID list to which a VID member belongs and a broadcast address.

To forward traffic, corresponding to a local VID member, the fourth FAR includes that: an external header creates tunnel information indicating the first reference point N3 or the second reference point N9 (including a downlink IP address and downlink GTP-U TED information that correspond to the N3 or N9 interface), and a target interface is an access side; or, corresponding to a device on a DN, the fourth FAR further includes that: an external header creates information indicating the third reference point N6, and a target interface is a core side; or, corresponding to a member connected to an N19 tunnel, the fourth FAR further includes that: an external header creates tunnel information indicating the fourth reference point N19 (including an IP address and GTP-U TED information that correspond to the N19 interface), and a target interface is a core side.

Fifth PDR and Fifth FAR

An SMF configures a fifth PDR and a fifth FAR that correspond to a group-level session to a UPF that has a need in a VID, so that the UPF processes a multicast data packet received from N6.

The fifth PDR and the fifth FAR that correspond to the group-level session are specified in the UPF. When detecting, by using the fifth PDR, that the multicast data packet is multicast data from the second internal multicast interface, the UPF transmits, by using the fifth FAR, the multicast data packet from the first reference point N3 or the second reference point N9 corresponding to each local VID member in the UPF to all local VID members in the UPF, as shown in FIG. 11.

To detect traffic, the fifth PDR includes that: a source interface is set to the second internal multicast interface, and a target address is a second VID list of the VID and a broadcast address.

To forward traffic, the fifth FAR includes that: an external header creates tunnel information indicating the first reference point N3 or the second reference point N9 (including a downlink IP address and downlink GTP-U TEID information that correspond to the N3 or N9 interface), and a target interface is an access side.

Eighth PDR and Eighth FAR

An SMF configures an eighth PDR and an eighth FAR that correspond to a group-level session to a UPF that has a need in a VID, so that the UPF processes a multicast data packet received from N19.

The eighth PDR and the eighth FAR that correspond to the group-level session are specified in the UPF. When detecting, by using the eighth PDR, that the multicast data packet is multicast data from the third internal multicast interface, the UPF transmits, by using the eighth FAR, the multicast data packet from the first reference point N3 or the second reference point N9 corresponding to each local VID member in the UPF to all local VID members in the UPF, as shown in FIG. 9.

To detect traffic, the eighth PDR includes that: a source interface is set to the third internal multicast interface, and a target address is a third VID list, where the third VID list is a VID list corresponding to another VID member connected to a local VID member through the fourth reference point N19.

To forward traffic, the eighth FAR includes that: an external header creates tunnel information indicating the first reference point N3 or the second reference point N9 (including a downlink IP address and downlink GTP-U TEID information that correspond to the N3 or N9 interface), and a target interface is an access side.

In an embodiment, the first VID list is all VIDs to which the VID member belongs.

In an embodiment, the second VID list is a VID list of all VIDs in the virtual network group; or the second VID list is a set of VID lists to which all local VID members in the first UPF belong.

In an embodiment, the third VID list is a VID list of all VIDs in the virtual network group; or the third VID list is an intersection set of a VID list to which local VID members in the first UPF belong and a VID list to which local VID members of the second UPF belong, and the second UPF is connected to the first UPF through the fourth reference point.

For a Third Implementation of a VID:

The VID lists and the broadcast addresses (the first VID list and the broadcast address, the second VID list and the broadcast address, and the third VID list and the broadcast address) in the PDR and the FAR include broadcast addresses of a plurality of VIDs, for example, three broadcast addresses or five broadcast addresses.

When there are m broadcast addresses in the VID lists, at least one of the first internal multicast interface, the second internal multicast interface, and the third internal multicast interface may be implemented as m internal multicast interfaces, and each internal multicast interface corresponds to a broadcast address of one VID; m being a positive integer, and i being an integer not greater than m.

When the first internal multicast interface is implemented as m first internal multicast interfaces, an $i^{th}$ first internal multicast interface corresponds to an $i^{th}$ VID, and it is assumed that the multicast address in the multicast data packet is the $i^{th}$ VID in the first VID list and the broadcast address.

The first PDR includes that: a source interface is set to an access side, a target address is set to the $i^{th}$ VID in the first VID list and the broadcast address, and core network tunnel information is set to a tunnel header of a first reference point or a second reference point of a PDU session; and the first FAR includes that: a target interface is set to the $i^{th}$ first internal multicast interface.

The fourth PDR includes that: a source interface is set to the $i^{th}$ first internal multicast interface, and a target address is the $i^{th}$ VID in the first VID list and the broadcast address; and the fourth FAR includes that: an external header creates tunnel information indicating the first reference point or the second reference point, and a target interface is an access side; or, the fourth FAR further includes that: an external header creates tunnel information indicating a third reference point, and a target interface is a core side; or, the fourth FAR further includes that: an external header creates tunnel information indicating a fourth reference point, and a target interface is a core side.

When the second internal multicast interface is implemented as m second internal multicast interfaces, an $i^{th}$ second internal multicast interface corresponds to an $i^{th}$ VID in the second VID list, and it is assumed that the multicast address in the multicast data packet is the $i^{th}$ VID in the second VID list and the broadcast address.

The second PDR includes that: a source interface is set to a core side, and a target address is set to the $i^{th}$ VID in the second VID list and the broadcast address; and the second FAR includes that: a target interface is set to the $i^{th}$ second internal multicast interface.

The fifth PDR includes that: a source interface is set to the $i^{th}$ second internal multicast interface, and a target address is the $i^{th}$ VID in the second VID list and the broadcast address; and the fifth FAR includes that: an external header creates tunnel information indicating the first reference point or the second reference point, and a target interface is an access side.

The third PDR includes that: a source interface is set to a core side, a target address is set to an $i^{th}$ VID in the third VID list and the broadcast address, and core network tunnel information is set to a tunnel header of a fourth reference point; and the third FAR includes that: a target interface is set to the $i^{th}$ second internal multicast interface, m being a positive integer, and i being an integer not greater than m.

The sixth PDR includes that: a source interface is set to the $i^{th}$ second internal multicast interface, and a target address is the $i^{th}$ VID in the third VID list and the broadcast address; and the sixth FAR includes that: an external header creates tunnel information indicating the first reference point or the second reference point, and a target interface is an access side.

When the third internal multicast interface is implemented as m third internal multicast interfaces, an $i^{th}$ third internal multicast interface corresponds to the $i^{th}$ VID in the second VID list, and it is assumed that the multicast address in the multicast data packet is the $i^{th}$ VID in the third VID list and the broadcast address.

The seventh PDR includes that: a source interface is set to a core side, a target address is set to the $i^{th}$ VID in the third VID list and the broadcast address, and core network tunnel information is set to a tunnel header of a fourth reference point; and the seventh FAR includes that: a target interface is set to the $i^{th}$ third internal multicast interface.

The eighth PDR includes that: a source interface is set to the $i^{th}$ third internal multicast interface, and a target address is the $i^{th}$ VID in the third VID list and the broadcast address; and the eighth FAR includes that: an external header creates tunnel information indicating the first reference point or the second reference point, and a target interface is an access side.

For example, the at least two internal multicast interfaces include a first internal multicast interface and m second internal multicast interfaces. Each second internal multicast interface corresponds to one VID, and m is a quantity of broadcast addresses.

The UPF transmits, when the multicast data packet is multicast data from the first reference point or the second reference point, the multicast data packet to the first internal multicast interface, and transmits, through the first internal multicast interface, the multicast data packet from the first reference point or the second reference point or a third reference point or a fourth reference point corresponding to each VID member of a VID to all VID members of the VID.

The UPF transmits, when the multicast data packet is multicast data from the third reference point or the fourth reference point and the broadcast address of the multicast data packet is an $i^{th}$ broadcast address, the multicast data packet to a second internal multicast interface corresponding to the $i^{th}$ VID, and transmits the multicast data packet from the first reference point or the second reference point corresponding to each local VID member of the VID in the UPF to all local VID members in the UPF through the second internal multicast interface corresponding to the $i^{th}$ VID.

An embodiment of m first internal multicast interfaces or an embodiment of m third internal multicast interfaces is easily conceived by a person skilled in the art according to the foregoing embodiments, and is not described one by one.

PDR and FAR Configuration Process

Figure 14:
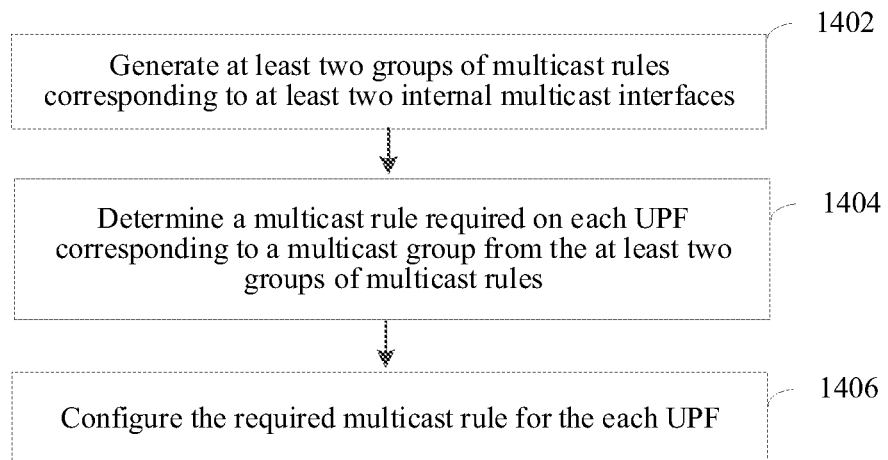
FIG. 14 is a flowchart of a multicast method for a virtual network group according to an example embodiment of the disclosure.

The PDR and the FAR are configured by an SMF for a corresponding UPF. FIG. 14 shows a flowchart of a multicast method for a multicast group of a virtual network group according to an example embodiment of the disclosure. The method may be performed by an SMF, and the method includes the following steps:

Step 1402: The SMF generates at least two groups of multicast rules corresponding to at least two internal multicast interfaces.

Step 1404: Determine a multicast rule required on each UPF corresponding to the multicast group from the at least two groups of multicast rules, the multicast group being a conventional multicast group in the virtual network group, or the multicast group being a group identified by using a VID.

Step 1406: The SMF configures the required multicast rule for each UPF.

It may be learned from the foregoing embodiments that the at least two internal multicast interfaces have a plurality of implementations.

Figure 15:
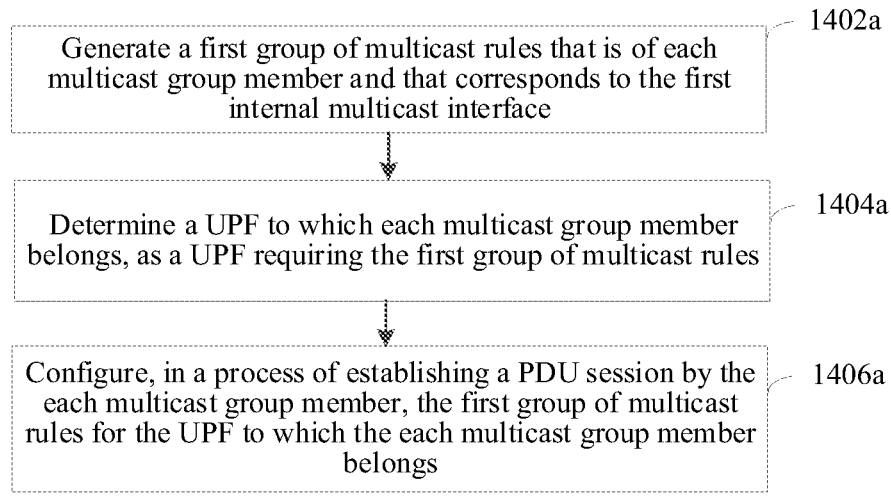
FIG. 15 is a flowchart of a multicast method for a virtual network group according to an example embodiment of the disclosure.

When the at least two internal multicast interfaces include a first internal multicast interface, the at least two groups of multicast rules include a first group of multicast rules that is of each multicast group member and that corresponds to the first internal multicast interface. Steps 1402, 1404, and 1406 may be implemented as follows, as shown in FIG. 15:

Step 1402*a*: The SMF generates a first group of multicast rules that is of each multicast group member and that corresponds to the first internal multicast interface.

Step 1404*a*: Determine a UPF to which each multicast group member belongs, as a UPF requiring the first group of multicast rules.

Step 1406*a*: Configure, in a process of establishing a PDU session by each multicast group member, the first group of multicast rules for the UPF to which each multicast group member belongs.

The first group of multicast rules includes the first PDR and the first FAR, and the fourth PDR and the fourth FAR, as mentioned in the foregoing embodiment.

Figure 16:
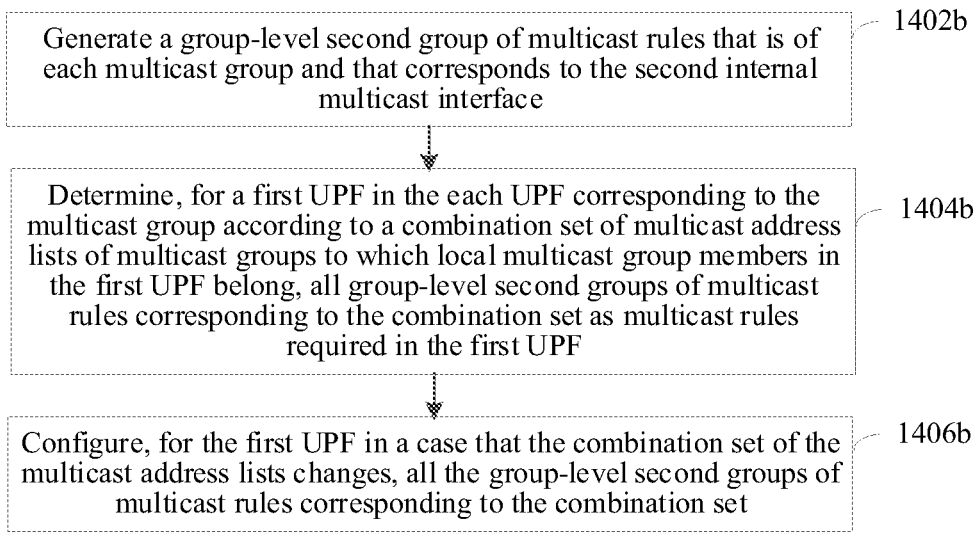
FIG. 16 is a flowchart of a multicast method for a virtual network group according to an example embodiment of the disclosure.

When the at least two internal multicast interfaces include a second internal multicast interface, the at least two multicast rules include a group-level second group of multicast rules that is of each multicast group and that corresponds to the second internal multicast interface, and the second group of multicast rules is used for forwarding a multicast data packet from the third reference point N6. Steps 1402, 1404, and 1406 may be implemented as the following steps, as shown in FIG. 16:

Step 1402*b*: The SMF generates a group-level second group of multicast rules that is of each multicast group and that corresponds to the second internal multicast interface.

The second group of multicast rules is used for forwarding the multicast data packet from the third reference point.

Step 1404*b*: Determine, for a first UPF in each UPF corresponding to the multicast group according to a combination set of multicast address lists of multicast groups to which local multicast group members in the first UPF belong, all group-level second groups of multicast rules corresponding to the combination set as multicast rules required in the first UPF.

When UEs in the first UPF increase or decrease, the SMF calculates the combination set of the multicast address lists of the multicast groups to which the local multicast group members in the first UPF belong. The SMF determines all the group-level second groups of multicast rules corresponding to the combination set of the multicast address lists as the multicast rules required in the first UPF.

Step 1406b: Configure, for the first UPF when the combination set of the multicast address lists changes, all the group-level second groups of multicast rules corresponding to the combination set.

The SMF configures, for the first UPF when the combination set changes (e.g., a UE is added or deleted), all the group-level second groups of multicast rules corresponding to the combination set of the multicast address lists.

The second group of multicast rules includes a second PDR and a second FAR, and a fifth PDR and a fifth FAR.

Because there may be a plurality of members in the virtual network group, there may be a plurality of selected UPFs, and one N6 GTP-U tunnel is recommended for sharing between the plurality of UPFs.

Figure 17:
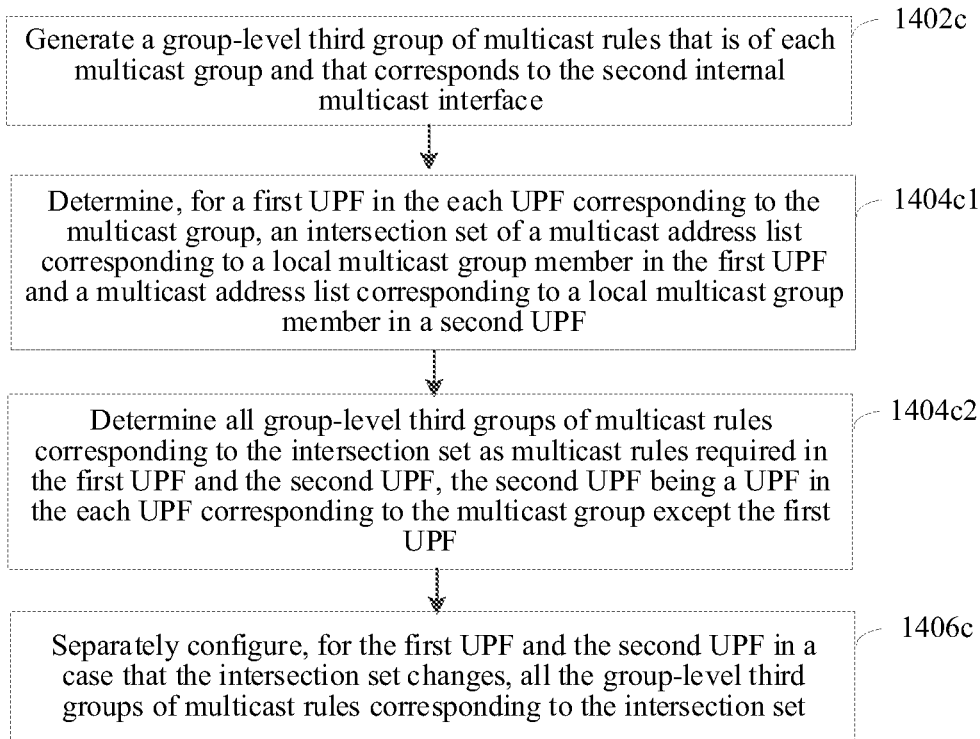
FIG. 17 is a flowchart of a multicast method for a virtual network group according to an example embodiment of the disclosure.

When the at least two internal multicast interfaces include a second internal multicast interface, the at least two multicast rules include a group-level third group of multicast rules that is of each multicast group and that corresponds to the second internal multicast interface, and the third group of multicast rules is used for forwarding a multicast data packet from the fourth reference point N19. Steps 1402, 1404, and 1406 may be implemented as the following steps, as shown in FIG. 17:

Step 1402c: The SMF generates a group-level third group of multicast rules that is of each multicast group and that corresponds to the second internal multicast interface.

The third group of multicast rules is used for forwarding the multicast data packet from the fourth reference point N19.

Step 1404c1: Determine, for a first UPF in each UPF corresponding to the multicast group, an intersection set of a multicast address list corresponding to a local multicast group member in the first UPF and a multicast address list corresponding to a local multicast group member in a second UPF.

Step 1404c2: Determine all group-level third groups of multicast rules corresponding to the intersection set as multicast rules required in the first UPF and the second UPF, the second UPF being a UPF in each UPF corresponding to the multicast group except the first UPF.

Step 1406c: The SMF separately configures, for the first UPF and the second UPF when the intersection set changes, all the group-level third groups of multicast rules corresponding to the intersection set.

The SMF separately configures, for the first UPF and the second UPF when the intersection set changes (e.g., a UE is added or deleted), all the group-level third groups of multicast rules corresponding to the intersection set.

The third group of multicast rules includes a third PDR and a third FAR, and a sixth PDR and a sixth FAR.

Figure 18:
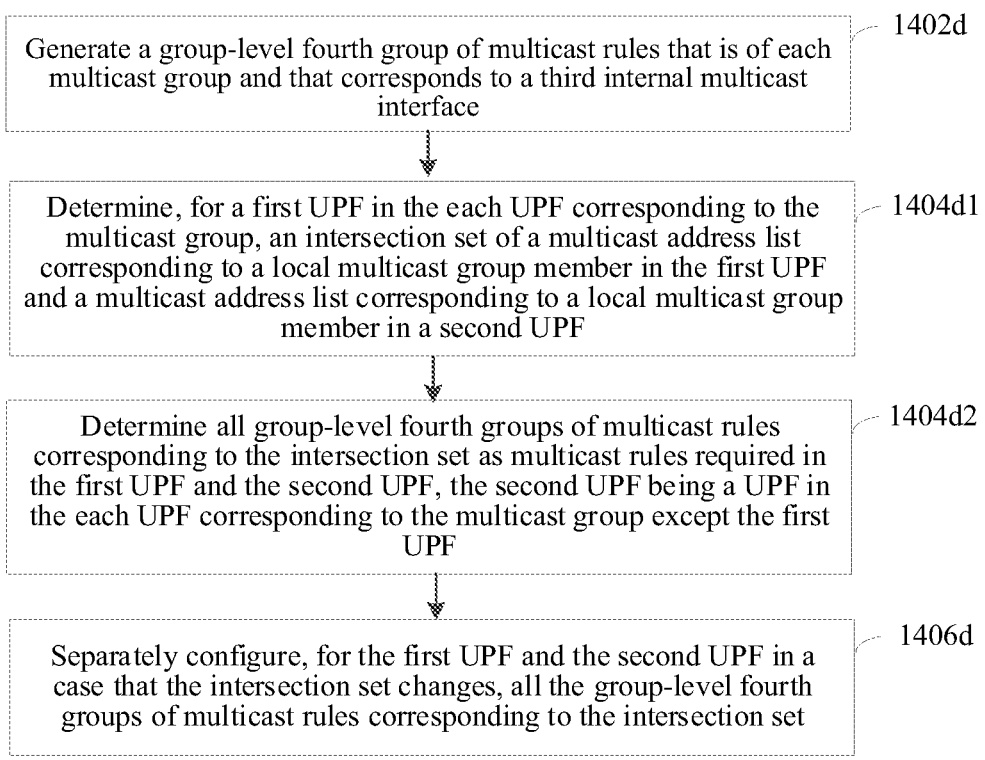
FIG. 18 is a flowchart of a multicast method for a virtual network group according to an example embodiment of the disclosure.

When the at least two internal multicast interfaces include a third internal multicast interface, the at least two multicast rules include a group-level fourth group of multicast rules that is of each multicast group and that corresponds to the third internal multicast interface, and the fourth group of multicast rules is used for forwarding a multicast data packet from the fourth reference point N19. Steps 1402, 1404, and 1406 may be implemented as the following steps, as shown in FIG. 18:

Step 1402d: The SMF generates a group-level fourth group of multicast rules that is of each multicast group and that corresponds to the third internal multicast interface.

The fourth group of multicast rules is used for forwarding the multicast data packet from the fourth reference point N19.

Step 1404d1: Determine, for a first UPF in each UPF corresponding to the multicast group, an intersection set of a multicast address list corresponding to a local multicast group member in the first UPF and a multicast address list corresponding to a local multicast group member in a second UPF.

Step 1404d2: Determine all group-level fourth groups of multicast rules corresponding to the intersection set as multicast rules required in the first UPF and the second UPF, the second UPF being a UPF in each UPF corresponding to the multicast group except the first UPF.

Step 1406d: The SMF separately configures, for the first UPF and the second UPF when the intersection set changes, all the group-level fourth groups of multicast rules corresponding to the intersection set.

The SMF separately configures, for the first UPF and the second UPF when the intersection set changes (e.g., a UE is added or deleted), all the group-level fourth groups of multicast rules corresponding to the intersection set.

The fourth group of multicast rules includes a seventh PDR and a seventh FAR, and an eighth PDR and an eighth FAR.

Four group-level N4 sessions used by the virtual network group are responsible for transmitting multicast data packets received from N6 and N19 to internal multicast interfaces, and forwarding data transmitted from the internal multicast interfaces to the PDR and the FAR of N6 and N19, which is independent of an N4 session of each UE (one UE establishes one PDU session and has one PDU session-level N4 session). That is, the four N4 sessions are N4 sessions used by all members in the virtual network group (equivalent to that the four sessions need to be used by all the members in the virtual network group, but do not need to be independently defined for each member).

Figure 19:
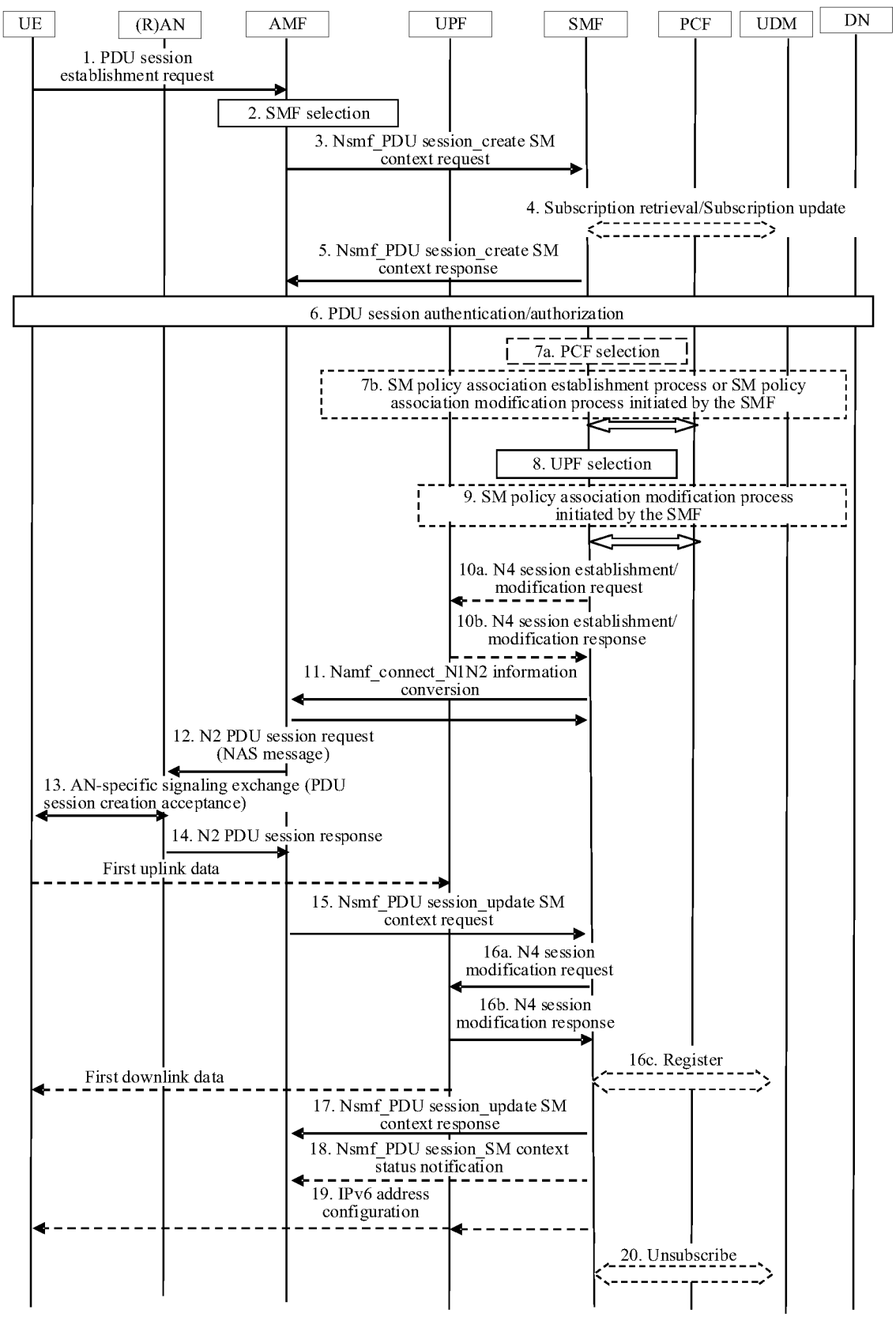
FIG. 19 shows a flowchart of protocol data unit (PDU) session establishment requested by a UE (for non-roaming and local breakout roaming scenarios).

In an example, FIG. 19 shows a flowchart of PDU session establishment requested by a UE (for non-roaming and local breakout roaming scenarios). For a detailed description of FIG. 19, refer to the description of FIG. 4.3.2.2.2 of 3GPP technical specification 23.502. Details are not described herein.

For the configuration process shown in FIG. 15, each UE in the virtual network group needs to establish a PDU session. For each UE in the virtual network group, the SMF may configure the first group of multicast rules (the first PDR, the first FAR, the fourth PDR, and the fourth FAR) for the UPF in the N4 session process in step 10a, that is, "an N4 session establishment/modification request transmitted by the SMF to the UPF".

For the configuration process shown in FIG. 16, the SMF may deliver, in a "UPF selection process" in step 8, the group-level second group of multicast rules relating to the N6 interface (the second PDR, the second FAR, the fifth PDR, and the fifth FAR) for the corresponding UPF.

For the configuration process shown in FIG. 17, the SMF may deliver, in a "UPF selection process" in step 8, the group-level third group of multicast rules relating to the N19 interface (the third PDR, the third FAR, the sixth PDR, and the sixth FAR) for the corresponding UPF.

For the configuration process shown in FIG. 18, the SMF may deliver, in a "UPF selection process" in step 8, the group-level fourth group of multicast rules relating to the N19 interface (the seventh PDR, the seventh FAR, the eighth PDR, and the eighth FAR) for the corresponding UPF.

Figure 20:
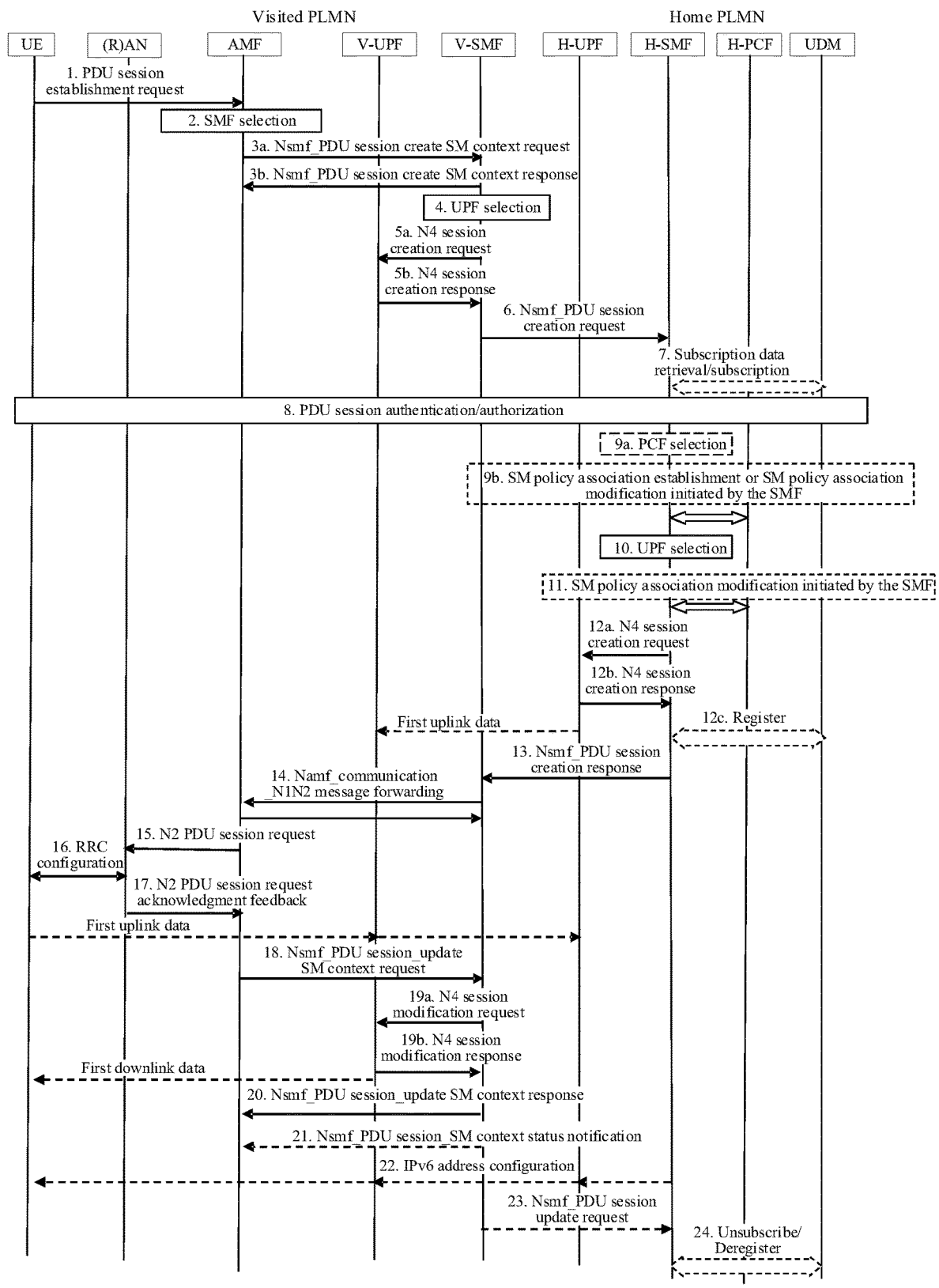
FIG. 20 shows a flowchart of PDU session establishment requested by a UE (for a home routed roaming scenario).

In an example, FIG. 20 shows a flowchart of PDU session establishment requested by a UE (for a home routed roaming scenario). The configuration process shown in FIG. 15, FIG. 16, FIG. 17, or FIG. 18 is performed in step 10 "UPF selection process" and step 12a "N4 session establishment request" in FIG. 20, instead of step 4 "UPF selection process" and step 5 "N4 session establishment request". For a detailed description of FIG. 18, refer to the description of FIG. 4.3.2.2.2-1 of 3GPP technical specification 23.502. Details are not described herein.

In the foregoing first implementation and second implementation of FIGS. 19 and 20, the PDR and the FAR include a multicast address list. When the multicast address list changes (adding, modifying, or deleting), all corresponding PDRs and FARs need to be modified.

The first group of multicast rules includes a first multicast address list, and when a multicast address in the first multicast address list is added, modified, or deleted, the first multicast address list is updated to a UPF corresponding to each multicast group member in the multicast group.

The second group of multicast rules includes a second multicast address list, and when a multicast address in the second multicast address list is added, modified, or deleted, a UPF that requires the second group of multicast rules is re-determined; and the second multicast address list is updated to the UPF that requires the second group of multicast rules.

The third group of multicast rules includes a third multicast address list, and when a multicast address in the third multicast address list is added, modified, or deleted, a UPF that requires the third group of multicast rules is re-determined; and the third multicast address list is updated to the UPF that requires the third group of multicast rules.

The fourth group of multicast rules includes a third multicast address list, and when a multicast address in the third multicast address list is added, modified, or deleted, a UPF that requires the fourth group of multicast rules is re-determined; and the third multicast address list is updated to the UPF that requires the fourth group of multicast rules. Alternatively:

The first group of multicast rules includes a first VID list, and when a VID in the first VID list is added, modified, or deleted, the first VID list is updated to a UPF corresponding to each multicast group member in the multicast group.

The second group of multicast rules includes a second VID list, and when a VID in the second VID list is added, modified, or deleted, a UPF that requires the second group of multicast rules is re-determined; and the second VID list is updated to the UPF that requires the second group of multicast rules.

The third group of multicast rules includes a third VID list, and when a VID in the third VID list is added, modified, or deleted, a UPF that requires the third group of multicast rules is re-determined; and the third VID list is updated to the UPF that requires the third group of multicast rules.

The fourth group of multicast rules includes a third VID list, and when a VID in the third VID list is added, modified, or deleted, a UPF that requires the fourth group of multicast rules is re-determined; and the third VID list is updated to the UPF that requires the fourth group of multicast rules.

Figure 21:
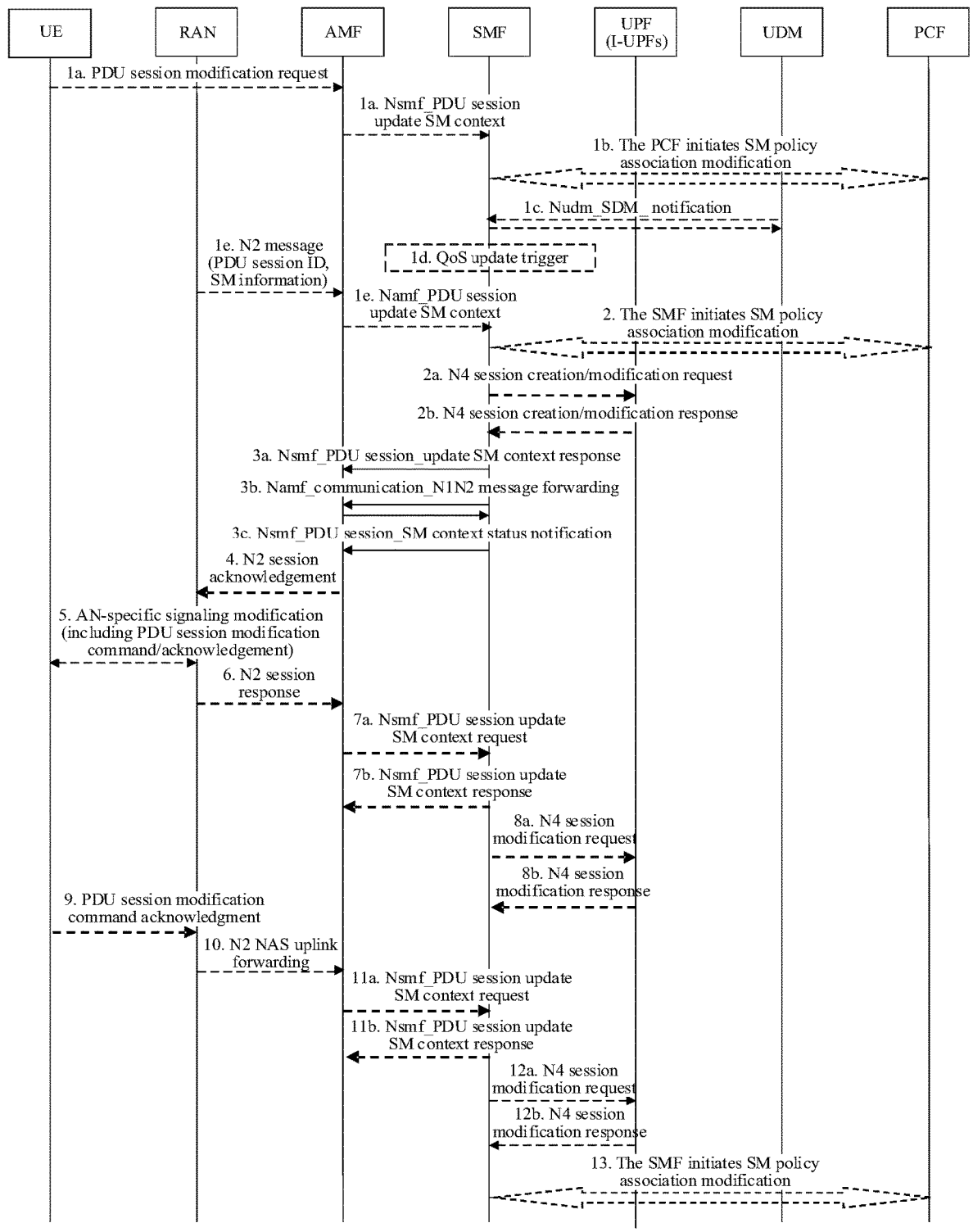
FIG. 21 shows a flowchart of PDU session modification requested by a UE or a network (for non-roaming and local breakout roaming scenarios).

FIG. 21 shows a flowchart of PDU session modification requested by a UE or a network (for non-roaming and local breakout roaming scenarios). The process of modifying the multicast address list by the SMF may be performed in any one of the following steps: step 2a "N4 session establishment/modification request", step 8a "N4 session modification request" and step 12a "N4 session modification request". For a detailed description of FIG. 21, refer to the description of FIG. 4.3.2.2.2 of 3GPP technical specification 23.502. Details are not described herein.

Figure 22:
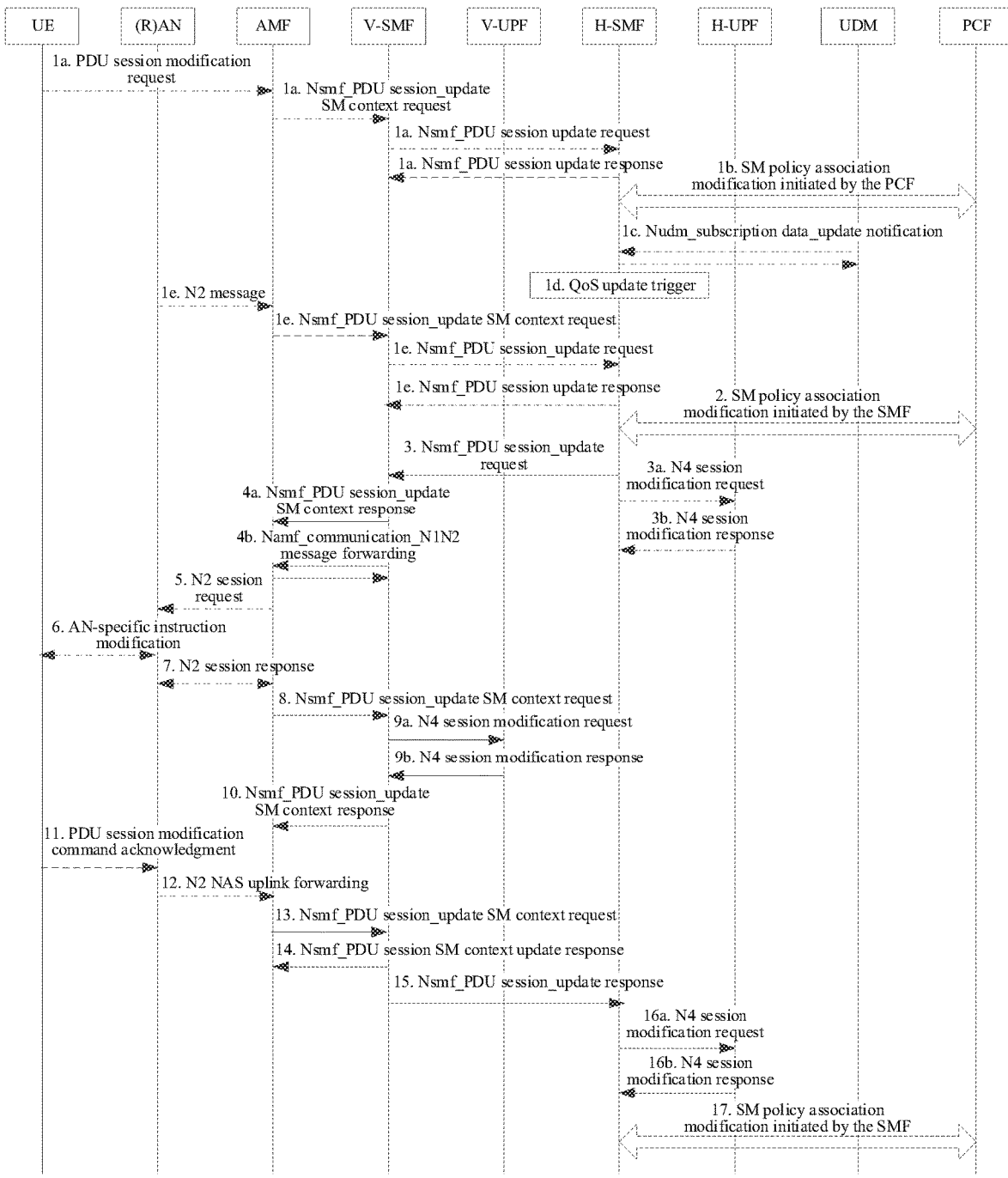
FIG. 22 shows a flowchart of PDU session modification requested by a UE or a network (for a home routed roaming scenario).

FIG. 22 shows a flowchart of PDU session modification requested by a UE or a network (for a home routed roaming scenario). The process of modifying the multicast address list by the SMF may be performed in step 16a "N4 session modification request" between H-SMF and H-UPF. For a detailed description of FIG. 22, refer to the description of FIG. 4.3.2.2.2-1 of 3GPP technical specification 23.502. Details are not described herein.

For a scenario in which a UE moves from one UPF to another UPF:

Run, when a multicast group member moves from one UPF to another UPF, the first group of multicast rules corresponding to the multicast group member on a PDU session newly created or relocated on the another UPF.

In an example embodiment, the method further includes:
calculating, when a multicast group member moves from the first UPF to a third UPF, a combination set of multicast address lists of multicast groups to which local multicast group members on the third UPF belong, and determining all group-level second groups of multicast rules corresponding to the combination set as multicast rules required in the third UPF.

In an example embodiment, the method further includes:
calculating, when a multicast group member moves from the first UPF to a fourth UPF, an intersection set of a multicast address list corresponding to a local multicast group member on the fourth UPF and a multicast address list corresponding to a local multicast group member on a fifth UPF; and determining all group-level third groups of multicast rules corresponding to the intersection set as multicast rules required in the fourth UPF and the fifth UPF, the fifth UPF being a UPF in each UPF corresponding to the multicast group except the fourth UPF; and separately configuring, for the fourth UPF and the fifth UPF when the intersection set changes, all the group-level third groups of multicast rules corresponding to the intersection set.

In an example embodiment, the method further includes:
calculating, when a multicast group member moves from the first UPF to a sixth UPF, an intersection set of a multicast address list corresponding to a local multicast group member on the sixth UPF and a multicast address list corresponding to a local multicast group member on a seventh UPF; and determining all group-level fourth groups of multicast rules corresponding to the intersection set as multicast rules required in the sixth UPF and the seventh UPF, the seventh UPF being a UPF in each UPF corresponding to the multicast group except the sixth UPF; and separately configuring, for the sixth UPF and the seventh UPF when the intersection set changes, all the group-level fourth groups of multicast rules corresponding to the intersection set.

An execution sequence of the foregoing four steps is not limited, and each step may be independently performed. This is not limited in this embodiment of the disclosure.

Apparatus embodiments of the disclosure are described below. Reference may be made to the foregoing method embodiments for details that are not described in detail in the apparatus embodiments.

Figure 23:
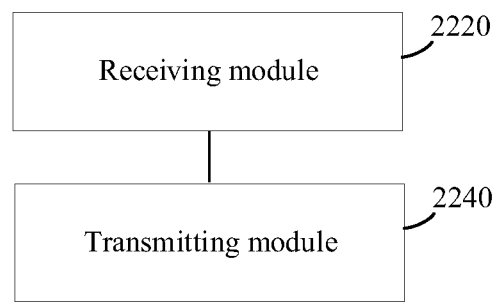
FIG. 23 is a schematic structural diagram of a multicast apparatus for a virtual network group according to an example embodiment of the disclosure.
Figure 24:
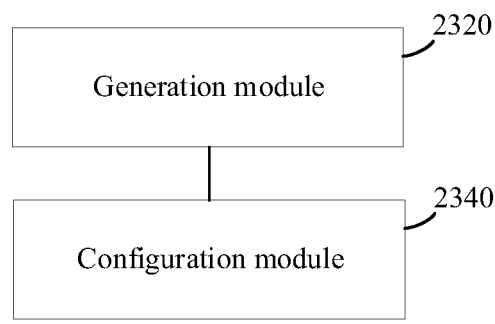
FIG. 24 is a schematic structural diagram of a multicast apparatus for a virtual network group according to an example embodiment of the disclosure.

FIG. 23 shows a block diagram of a multicast apparatus for a multicast group of a virtual network group according to an example embodiment of the disclosure. The apparatus may be implemented as a part of a first UPF. The apparatus includes:

a receiving module 2320, configured to receive a multicast data packet transmitted by a member of the virtual network group, a destination address of the multicast data packet being a multicast address; and a transmitting module 2340, configured to transmit the multicast data packet to at least one target internal multicast interface, which is a dedicated interface for a multicast session, and transmit the multicast data packet to all members or all local multicast group members of the virtual network group through the at least one target internal multicast interface; the multicast group being a conventional multicast group in the virtual network group, or the multicast group being a group identified by using a VID, the multicast group member being a VID member, and the multicast data packet being a data packet transmitted by using a broadcast address of the VID.

In an example embodiment, the at least one target internal multicast interface may include a first internal multicast interface and a second internal multicast interface.

The transmitting module 2340 is configured to: transmit, when the multicast data packet is multicast data from a first reference point or a second reference point, the multicast data packet to the first internal multicast interface, and transmit, through the first internal multicast interface, the multicast data packet from the first reference point or the second reference point or a third reference point or a fourth reference point corresponding to each multicast group member of the multicast group to all the multicast group members of the multicast group; and the transmitting module 2340 is configured to: transmit the multicast data packet to the second internal multicast interface when the multicast data packet is multicast data from the third reference point or the fourth reference point, and transmit, through the second internal multicast interface, the multicast data packet from the first reference point or the second reference point corresponding to each local multicast group member of the multicast group in the first UPF to all the local multicast group members of the multicast group;

the first reference point being a reference point between an access network and the first UPF, the second reference point being a reference point between the first UPF and an internal UPF, the third reference point being a reference point between the first UPF and a DN, and the fourth reference point being a reference point between the first UPF and another PSA UPF.

In an example embodiment, the at least one target internal multicast interface may include a first internal multicast interface, a second internal multicast interface, and a third internal multicast interface.

The transmitting module 2340 is configured to: transmit, when the multicast data packet is multicast data from a first reference point or a second reference point, the multicast data packet to the first internal multicast interface, and transmit, through the first internal multicast interface, the multicast data packet from the first reference point or the second reference point or a third reference point or a fourth reference point corresponding to each multicast group member of the multicast group to all the multicast group members of the multicast group;

the transmitting module 2340 is configured to: transmit the multicast data packet to the second internal multicast interface when the multicast data packet is multicast data from the third reference point, and transmit, through the second internal multicast interface, the multicast data packet from the first reference point or the second reference point corresponding to each local multicast group member of the multicast group in the first UPF to all the local multicast group members of the multicast group; and the transmitting module 2340 is configured to: transmit the multicast data packet to the third internal multicast interface when the multicast data packet is multicast data from the fourth reference point, and transmit, through the third internal multicast interface, the multicast data packet from the first reference point or the second reference point corresponding to each local multicast group member of the multicast group in the first UPF to all the local multicast group members of the multicast group;

the first reference point being a reference point between an access network and the first UPF, the second reference point being a reference point between the first UPF and an internal UPF, the third reference point being a reference point between the first UPF and a DN, and the fourth reference point being a reference point between the first UPF and another PSA UPF.

In an example embodiment, a first PDR and a first FAR that correspond to the multicast group member in the multicast group are set in the UPF.

The transmitting module 2340 is configured to: transmit the multicast data packet to the first internal multicast interface by using the first FAR in a case of detecting, by using the first PDR, that the multicast data packet is multicast data from the first reference point or the second reference point.

In an example embodiment, when there is one first internal multicast interface, the first PDR includes that: a source interface is set to an access side, a target address is set to a first multicast address list to which the multicast group member belongs, and core network tunnel information is set to a tunnel header of the first reference point or the second reference point of a protocol data unit PDU session; and the first FAR includes that: a target interface is set to the first internal multicast interface; or when there are m first internal multicast interfaces, an $i^{th}$ first internal multicast interface corresponds to an $i^{th}$ multicast address in the first multicast address list, the $i^{th}$ multicast address is a multicast address in the multicast data packet, and the first PDR includes that: a source interface is set to an access side, a target address is set to the $i^{th}$ multicast address, and core network tunnel information is set to a tunnel header of the first reference point or the second reference point of a PDU session; and the first FAR includes that: a target interface is set to the $i^{th}$ first internal multicast interface, m being a positive integer, and i being an integer not greater than m; or when there is one first internal multicast interface, the first PDR includes that: a source interface is set to an access side, a target address is set to a first VID list to which the VID member belongs and a broadcast address, and core network tunnel information is set to a tunnel header of the first reference point or the second reference point of a PDU session; and the first FAR includes that: a target interface is set to the first internal multicast interface; or when there are m first internal multicast interfaces, an $i^{th}$ first internal multicast interface corresponds to an $i^{th}$ VID in the first VID list, the $i^{th}$ VID and a broadcast address are a multicast address in the multicast data packet, and the first PDR includes that: a source interface is set to an access side, a target address is set to the $i^{th}$ VID and the broadcast address, and core network tunnel information is set to a tunnel header of the first reference point or the second reference point of a PDU session; and the first FAR includes that: a target interface is set to the $i^{th}$ first internal multicast interface, m being a positive integer, and i being an integer not greater than m.

In an example embodiment, the multicast address in the multicast data packet is a multicast address in the first multicast address list; or the multicast address in the multicast data packet is a VID in the first VID list.

In an example embodiment, when the UPF needs to receive multicast data from the third reference point, a second PDR and a second FAR that correspond to a group-level session are set in the UPF, and the group-level session is a session between the UPF and an SMF.

The transmitting module 2340 is configured to: transmit the multicast data packet to the second internal multicast interface by using the second FAR in a case of detecting, by using the second PDR, that the multicast data packet is multicast data from the third reference point.

In an example embodiment, when there is one second internal multicast interface, the second PDR includes that: a source interface is set to a core side, and a target address is set to a second multicast address list; and the second FAR includes that: a target interface is set to the second internal multicast interface; or when there are m second internal multicast interfaces, an $i^{th}$ second internal multicast interface corresponds to an $i^{th}$ multicast address in the second multicast address list, the $i^{th}$ multicast address is a multicast address in the multicast data packet, and the second PDR includes that: a source interface is set to a core side, and a target address is set to the $i^{th}$ multicast address; and the second FAR includes that: a target interface is set to the $i^{th}$ second internal multicast interface, m being a positive integer, and i being an integer not greater than m; or when there is one second internal multicast interface, the second PDR includes that: a source interface is set to a core side, and a target address is set to a second VID list to which a VID member belongs and a broadcast address; and the second FAR includes that: a target interface is set to the second internal multicast interface; or when there are m second internal multicast interfaces, an $i^{th}$ second internal multicast interface corresponds to an $i^{th}$ VID in the second VID list, the $i^{th}$ VID and a broadcast address are a multicast address in the multicast data packet, and the second PDR includes that: a source interface is set to a core side, and a target address is set to the $i^{th}$ VID and the broadcast address; and the second FAR includes that: a target interface is set to the $i^{th}$ second internal multicast interface, m being a positive integer, and i being an integer not greater than m.

In an example embodiment, the second multicast address list is a multicast address list of all multicast groups in the virtual network group; or the second multicast address list is a set of multicast address lists of multicast groups to which all local multicast group members in the first UPF belong; or the second VID list is a VID list of all VIDs in the virtual network group; or the second VID list is a set of VID lists to which all local VID members in the first UPF belong.

In an example embodiment, when the first UPF needs to receive multicast data from the fourth reference point, a third PDR and a third FAR that correspond to a group-level session are set in the first UPF, and the group-level session is a session between the first UPF and an SMF.

The transmitting module 2340 is configured to: transmit the multicast data packet to the second internal multicast interface by using the third FAR in a case of detecting, by using the third PDR, that the multicast data packet is multicast data from the fourth reference point.

In an example embodiment, when there is one second internal multicast interface, the third PDR includes that: a source interface is set to a core side, a target address is set to a third multicast address list, and core network tunnel information is set to a tunnel header of the fourth reference point; and the third FAR includes that: a target interface is set to the second internal multicast interface; or when there are m second internal multicast interfaces, an $i^{th}$ second internal multicast interface corresponds to an $i^{th}$ multicast address in the third multicast address list, the $i^{th}$ multicast address is a multicast address in the multicast data packet, and the third PDR includes that: a source interface is set to a core side, a target address is set to the $i^{th}$ multicast address, and core network tunnel information is set to a tunnel header of the fourth reference point; and the third FAR includes that: a target interface is set to the $i^{th}$ second internal multicast interface, m being a positive integer, and i being an integer not greater than m; or when there is one second internal multicast interface, the third PDR includes that: a source interface is set to a core side, a target address is set to a third VID list to which a VID member belongs and a broadcast address, and core network tunnel information is set to a tunnel header of the fourth reference point; and the third FAR includes that: a target interface is set to the second internal multicast interface; or when there are m second internal multicast interfaces, an $i^{th}$ second internal multicast interface corresponds to an $i^{th}$ VID in the third VID list and a broadcast address, the $i^{th}$ VID and the broadcast address are a multicast address in the multicast data packet, and the third PDR includes that: a source interface is set to a core side, a target address is set to the $i^{th}$ VID and the broadcast address, and core network tunnel information is set to a tunnel header of the fourth reference point; and the third FAR includes that: a target interface is set to the $i^{th}$ second internal multicast interface, m being a positive integer, and i being an integer not greater than m.

In an example embodiment, the third multicast address list is a multicast address list of all multicast groups in the virtual network group; or the third multicast address list is an intersection set of a multicast address list of multicast groups to which local multicast group members in the first UPF belong and a multicast address list of multicast groups to which local multicast group members of a second UPF belong, and the second UPF is connected to the first UPF through the fourth reference point; or the third VID list is a VID list of all VIDs in the virtual network group; or the third VID list is an intersection set of a VID list to which local VID members in the first UPF belong and a VID list to which local VID members of the second UPF belong, and the second UPF is connected to the first UPF through the fourth reference point.

In an example embodiment, a fourth PDR and a fourth FAR that correspond to the multicast group member in the multicast group are set in the first UPF.

The transmitting module 2340 is configured to: transmit, by using the fourth FAR, the multicast data packet from the first reference point or the second reference point or the third reference point or the fourth reference point corresponding to each multicast group member of the multicast group to all the multicast group members of the multicast group in a case of detecting, by using the fourth PDR, that the multicast data packet is multicast data from the first internal multicast interface.

In an example embodiment, when there is one first internal multicast interface, the fourth PDR includes that: a source interface is set to the first internal multicast interface, and a target address is a first multicast address list to which the multicast group member belongs; and the fourth FAR includes that: an external header creates tunnel information indicating the first reference point or the second reference point, and a target interface is an access side; or the fourth FAR further includes that: an external header creates tunnel information indicating the third reference point, and a target interface is a core side; or the fourth FAR further includes that: an external header creates tunnel information indicating the fourth reference point, and a target interface is a core side; or when there are m first internal multicast interfaces, an $i^{th}$ first internal multicast interface corresponds to an $i^{th}$ multicast address in the first multicast address list, and the $i^{th}$ multicast address is a multicast address in the multicast data packet; the fourth PDR includes that: a source interface is set to the $i^{th}$ first internal multicast interface, and a target address is the $i^{th}$ multicast address; and the fourth FAR includes that: an external header creates tunnel information indicating the first reference point or the second reference point, and a target interface is an access side; or the fourth FAR further includes that: an external header creates tunnel information indicating the third reference point, and a target interface is a core side; or the fourth FAR further includes that: an external header creates tunnel information indicating the fourth reference point, and a target interface is a core side; or when there is one first internal multicast interface, the fourth PDR includes that: a source interface is set to the first internal multicast interface, and a target address is a first VID list to which the VID member belongs and a broadcast address; the fourth FAR includes that: an external header creates tunnel information indicating the first reference point or the second reference point, and a target interface is an access side; or the fourth FAR further includes that: an external header creates tunnel information indicating the third reference point, and a target interface is a core side; or the fourth FAR further includes that: an external header creates tunnel information indicating the fourth reference point, and a target interface is a core side; or when there are m first internal multicast interfaces, an $i^{th}$ first internal multicast interface corresponds to an $i^{th}$ VID in the first VID list, and the $i^{th}$ VID and a broadcast address are a multicast address in the multicast data packet; the fourth PDR includes that: a source interface is set to the $i^{th}$ first internal multicast interface, and a target address is the $i^{th}$ VID and the broadcast address; and the fourth FAR includes that: an external header creates tunnel information indicating the first reference point or the second reference point, and a target interface is an access side; or the fourth FAR further includes that: an external header creates tunnel information indicating the third reference point, and a target interface is a core side; or the fourth FAR further includes that: an external header creates tunnel information indicating the fourth reference point, and a target interface is a core side;

m being a positive integer, and i being an integer not greater than m.

In an example embodiment, when the first UPF needs to receive multicast data from the third reference point, a fifth PDR and a fifth FAR that correspond to a group-level session are set in the first UPF, and the group-level session is a session between the first UPF and an SMF.

The transmitting module 2340 is configured to: transmit, by using the fifth FAR, the multicast data packet from the first reference point or the second reference point corresponding to each local multicast group member of the multicast group in the first UPF to all the local multicast group members of the multicast group in a case of detecting, by using the fifth PDR, that the multicast data packet is multicast data from the second internal multicast interface.

In an example embodiment, when there is one second internal multicast interface, the fifth PDR includes that: a source interface is set to the second internal multicast interface, and a target address is a second multicast address list; and the fifth FAR includes that: an external header creates tunnel information indicating the first reference point or the second reference point, and a target interface is an access side; or when there are m second internal multicast interfaces, an $i^{th}$ second internal multicast interface corresponds to an $i^{th}$ multicast address in the second multicast address list, the $i^{th}$ multicast address is a multicast address in the multicast data packet, and the fifth PDR includes that: a source interface is set to the $i^{th}$ second internal multicast interface, and a target address is the $i^{th}$ multicast address; and the fifth FAR includes that: an external header creates tunnel information indicating the first reference point or the second reference point, and a target interface is an access side, m being a positive integer, and i being an integer not greater than m; or when there is one second internal multicast interface, the fifth PDR includes that: a source interface is set to the second internal multicast interface, and a target address is a second VID list of VIDs to which a VID member belongs and a broadcast address; and the fifth FAR includes that: an external header creates tunnel information indicating the first reference point or the second reference point, and a target interface is an access side; or when there are m second internal multicast interfaces, an $i^{th}$ second internal multicast interface corresponds to an $i^{th}$ VID in the second VID list and a broadcast address, the $i^{th}$ VID and the broadcast address are a multicast address in the multicast data packet, and the fifth PDR includes that: a source interface is set to the $i^{th}$ second internal multicast interface, and a target address is the $i^{th}$ VID and the broadcast address; and the fifth FAR includes that: an external header creates tunnel information indicating the first reference point or the second reference point, and a target interface is an access side, m being a positive integer, and i being an integer not greater than m.

In an example embodiment, when the first UPF needs to receive multicast data from the fourth reference point, a sixth PDR and a sixth FAR that correspond to a group-level session are set in the first UPF, and the group-level session is a session between the first UPF and an SMF.

The transmitting module 2340 is configured to: transmit, by using the sixth FAR, the multicast data packet from the first reference point or the second reference point corresponding to each local multicast group member of the multicast group in the first UPF to all the local multicast group members of the multicast group in a case of detecting, by using the sixth PDR, that the multicast data packet is multicast data from the second internal multicast interface.

In an example embodiment, when there is one second internal multicast interface, the sixth PDR includes that: a source interface is set to the second internal multicast interface, and a target address is a third multicast address list; and the sixth FAR includes that: an external header creates tunnel information indicating the first reference point or the second reference point, and a target interface is an access side; or when there are m second internal multicast interfaces, an $i^{th}$ second internal multicast interface corresponds to an $i^{th}$ multicast address in the third multicast address list, the $i^{th}$ multicast address is a multicast address in the multicast data packet, and the sixth PDR includes that: a source interface is set to the $i^{th}$ second internal multicast interface, and a target address is the $i^{th}$ multicast address; and the sixth FAR includes that: an external header creates tunnel information indicating the first reference point or the second reference point, and a target interface is an access side, m being a positive integer, and i being an integer not greater than m; or when there is one second internal multicast interface, the sixth PDR includes that: a source interface is set to the second internal multicast interface, and a target address is a third VID list to which a VID member belongs and a broadcast address; and the sixth FAR includes that: an external header creates tunnel information indicating the first reference point or the second reference point, and a target interface is an access side; or when there are m second internal multicast interfaces, an $i^{th}$ second internal multicast interface corresponds to an $i^{th}$ VID in the third VID list, the $i^{th}$ VID and a broadcast address are a multicast address in the multicast data packet, and the sixth PDR includes that: a source interface is set to the $i^{th}$ second internal multicast interface, and a target address is the $i^{th}$ VID and the broadcast address; and the sixth FAR includes that: an external header creates tunnel information indicating the first reference point or the second reference point, and a target interface is an access side, m being a positive integer, and i being an integer not greater than m.

In an example embodiment, when the first UPF needs to receive multicast data from the fourth reference point, a seventh PDR and a seventh FAR that correspond to a group-level session are set in the first UPF, and the group-level session is a session between the first UPF and an SMF.

The transmitting module 2340 is configured to: transmit the multicast data packet to the third internal multicast interface by using the seventh FAR in a case of detecting, by using the seventh PDR, that the multicast data packet is multicast data from the fourth reference point.

In an example embodiment, when there is one third internal multicast interface, the seventh PDR includes that: a source interface is set to a core side, a target address is set to a third multicast address list, and core network tunnel information is set to a tunnel header of the fourth reference point; and the seventh FAR includes that: a target interface is set to the third internal multicast interface; or when there are m third internal multicast interfaces, an $i^{th}$ third internal multicast interface corresponds to an $i^{th}$ multicast address in the third multicast address list, the $i^{th}$ multicast address is a multicast address in the multicast data packet, and the seventh PDR includes that: a source interface is set to a core side, a target address is set to the $i^{th}$ multicast address, and core network tunnel information is set to a tunnel header of the fourth reference point; and the seventh FAR includes that: a target interface is set to the $i^{th}$ third internal multicast interface, m being a positive integer, and i being an integer not greater than m; or when there is one third internal multicast interface, the seventh PDR includes that: a source interface is set to a core side, a target address is set to a third VID list of VIDs of a VID member belongs and a broadcast address, and core network tunnel information is set to a tunnel header of the fourth reference point; and the seventh FAR includes that: a target interface is set to the third internal multicast interface; or when there are m third internal multicast interfaces, an $i^{th}$ third internal multicast interface corresponds to an $i^{th}$ VID in the third VID list and a broadcast address, the $i^{th}$ VID and the broadcast address are a multicast address in the multicast data packet, and the seventh PDR includes that: a source interface is set to a core side, a target address is set to the $i^{th}$ VID and the broadcast address, and core network tunnel information is set to a tunnel header of the fourth reference point; and the seventh FAR includes that: a target interface is set to the $i^{th}$ third internal multicast interface, m being a positive integer, and i being an integer not greater than m.

In an example embodiment, when the first UPF needs to receive multicast data from the fourth reference point, an eighth PDR and an eighth FAR that correspond to a group-level session are set in the first UPF, and the group-level session is a session between the first UPF and an SMF.

The transmitting module 2340 is configured to: transmit, by using the eighth FAR, the multicast data packet from the first reference point or the second reference point corresponding to each local multicast group member of the multicast group in the first UPF to all the local multicast group members of the multicast group in a case of detecting, by using the eighth PDR, that the multicast data packet is multicast data from the third internal multicast interface.

In an example embodiment, when there is one third internal multicast interface, the seventh PDR includes that: a source interface is set to a core side, a target address is set to a third multicast address list, and core network tunnel information is set to a tunnel header of the fourth reference point; and the seventh FAR includes that: a target interface is set to the third internal multicast interface; or when there are m third internal multicast interfaces, an $i^{th}$ third internal multicast interface corresponds to an $i^{th}$ multicast address in the third multicast address list, the $i^{th}$ multicast address is a multicast address in the multicast data packet, and the seventh PDR includes that: a source interface is set to a core side, a target address is set to the $i^{th}$ multicast address, and core network tunnel information is set to a tunnel header of the fourth reference point; and the seventh FAR includes that: a target interface is set to the $i^{th}$ third internal multicast interface, m being a positive integer, and i being an integer not greater than m; or when there is one third internal multicast interface, the seventh PDR includes that: a source interface is set to a core side, a target address is set to a third VID list to which a VID member belongs and a broadcast address, and core network tunnel information is set to a tunnel header of the fourth reference point; and the seventh FAR includes that: a target interface is set to the third internal multicast interface; or when there are m third internal multicast interfaces, an $i^{th}$ third internal multicast interface corresponds to an $i^{th}$ VID in the third VID list, the $i^{th}$ VID and a broadcast address are a multicast address in the multicast data packet, and the seventh PDR includes that: a source interface is set to a core side, a target address is set to the $i^{th}$ VID and the broadcast address, and core network tunnel information is set to a tunnel header of the fourth reference point; and the seventh FAR includes that: a target interface is set to the $i^{th}$ third internal multicast interface, m being a positive integer, and i being an integer not greater than m.

FIG. 23 shows a block diagram of a multicast apparatus for a virtual network group according to an example embodiment of the disclosure. The apparatus may be implemented as a part of an SMF. The apparatus includes:

a generation module 2320, configured to generate at least two groups of multicast rules corresponding to at least one target internal multicast interface;

a determining module 2330, configured to determine a multicast rule required on each UPF corresponding to the multicast group from the at least two groups of multicast rules, the multicast group being a conventional multicast group in the virtual network group, or the multicast group being a group identified by using a VID; and a configuration module 2340, configured to configure the required multicast rule for each UPF.

In an example embodiment, the at least one target internal multicast interface may include a first internal multicast interface, and the at least two groups of multicast rules include a first group of multicast rules that is of each multicast group member and corresponds to the first internal multicast interface.

The determining module 2330 is configured to determine a UPF to which each multicast group member belongs, as a UPF requiring the first group of multicast rules; and The configuration module 2340 is configured to: configure, in a process of establishing a PDU session by each multicast group member, the first group of multicast rules for the UPF to which each multicast group member belongs.

In an example embodiment, the first group of multicast rules includes:

a first PDR and a first FAR; and
a fourth PDR and a fourth FAR.

In an example embodiment, the at least one target internal multicast interfaces may include a second internal multicast interface, the multicast rules include a group-level second group of multicast rules corresponding to the second internal multicast interface, and the second group of multicast rules is used for forwarding a multicast data packet from a third reference point.

The determining module 2330 is configured to: determine, for a first UPF in each UPF corresponding to the multicast group according to a combination set of multicast address lists of multicast groups to which local multicast group members in the first UPF belong, all group-level second groups of multicast rules corresponding to the combination set as multicast rules required in the first UPF; and the configuration module 2340 is configured to: configure, for the first UPF when the combination set changes, all the group-level second groups of multicast rules corresponding to the combination set of the multicast address lists.

In an example embodiment, the second group of multicast rules includes:

a second PDR and a second FAR; and
a fifth PDR and a fifth FAR.

In an example embodiment, the at least one target internal multicast interfaces may include a second internal multicast interface, the multicast rules include a group-level third group of multicast rules corresponding to the second internal multicast interface, and the third group of multicast rules is used for forwarding a multicast data packet from a fourth reference point.

The determining module 2330 is configured to: determine, for a first UPF in each UPF corresponding to the multicast group, an intersection set of a multicast address list corresponding to a local multicast group member in the first UPF and a multicast address list corresponding to a local multicast group member in a second UPF; and determine all group-level third groups of multicast rules corresponding to the intersection set as multicast rules required in the first UPF and the second UPF, the second UPF being a UPF in each UPF corresponding to the multicast group except the first UPF; and the configuration module 2340 is configured to: separately configure, for the first UPF and the second UPF when the intersection set changes, all the group-level third groups of multicast rules corresponding to the intersection set.

In an example embodiment, the third group of multicast rules includes:

a third PDR and a third FAR; and
a sixth PDR and a sixth FAR.

In an example embodiment, the at least one target internal multicast interfaces include a third internal multicast interface, the multicast rules include a group-level fourth group of multicast rules corresponding to the third internal multicast interface, and the fourth group of multicast rules is used for forwarding a multicast data packet from a fourth reference point.

The determining module 2330 is configured to: determine, for a first UPF in each UPF corresponding to the multicast group, an intersection set of a multicast address list corresponding to a local multicast group member in the first UPF and a multicast address list corresponding to a local multicast group member in a second UPF; and determine all group-level fourth groups of multicast rules corresponding to the intersection set as multicast rules required in the first UPF and the second UPF, the second UPF being a UPF in each UPF corresponding to the multicast group except the first UPF; and the configuration module 2340 is configured to: separately configure, for the first UPF and the second UPF when the intersection set changes, all the group-level fourth groups of multicast rules corresponding to the intersection set.

In an example embodiment, the fourth group of multicast rules includes:

a seventh PDR and a seventh FAR; and
an eighth PDR and an eighth FAR.

In an example embodiment, the first group of multicast rules includes a first multicast address list.

The configuration module 2340 is configured to: update the first multicast address list to a UPF corresponding to each multicast group member in the multicast group when a multicast address in the first multicast address list is added, modified, or deleted.

In an example embodiment, the second group of multicast rules includes a second multicast address list.

The configuration module 2340 is configured to: re-determine a UPF that requires the second group of multicast rules, and update the second multicast address list to the UPF that requires the second group of multicast rules when a multicast address in the second multicast address list is added, modified, or deleted.

In an example embodiment, the third group of multicast rules includes a third multicast address list.

The configuration module 2340 is configured to: re-determine a UPF that requires the third group of multicast rules, and update the third multicast address list to the UPF that requires the third group of multicast rules when a multicast address in the third multicast address list is added, modified, or deleted.

In an example embodiment, the fourth group of multicast rules includes a third multicast address list.

The configuration module 2340 is configured to: re-determine a UPF that requires the fourth group of multicast rules, and update the third multicast address list to the UPF that requires the fourth group of multicast rules when a multicast address in the third multicast address list is added, modified, or deleted.

In an example embodiment, the first group of multicast rules includes a first VID list.

The configuration module 2340 is configured to: update the first VID list to a UPF corresponding to each multicast group member in the multicast group when a multicast address in the first VID list is added, modified, or deleted.

In an example embodiment, the second group of multicast rules includes a second VID list.

The configuration module 2340 is configured to: re-determine a UPF that requires the second group of multicast rules, and update the second VID list to the UPF that requires the second group of multicast rules when a VID in the second VID list is added, modified, or deleted.

In an example embodiment, the third group of multicast rules includes a third VID list.

The configuration module 2340 is configured to: re-determine a UPF that requires the third group of multicast rules, and update the third VID list to the UPF that requires the third group of multicast rules when a VID in the third VID list is added, modified, or deleted.

In an example embodiment, the fourth group of multicast rules includes a third VID list.

The configuration module 2340 is configured to: re-determine a UPF that requires the fourth group of multicast rules, and update the third VID list to the UPF that requires the fourth group of multicast rules when a VID in the third VID list is added, modified, or deleted.

In an example embodiment, the apparatus further includes:
a configuration module 2340, configured to: run, when a multicast group member moves from one UPF to another UPF, the first group of multicast rules corresponding to the multicast group member on a PDU session newly created or relocated on the another UPF.

In an example embodiment, the apparatus further includes:
a configuration module 2340, configured to: calculate, when a multicast group member moves from the first UPF to a third UPF, a combination set of multicast address lists of multicast groups to which local multicast group members on the third UPF belong, and determine all group-level second groups of multicast rules corresponding to the combination set as multicast rules required in the third UPF; and configure all the group-level second groups of multicast rules corresponding to the combination set for the third UPF.

In an example embodiment, the apparatus further includes:
a configuration module 2340, configured to: calculate, when a multicast group member moves from the first UPF to a fourth UPF, an intersection set of a multicast address list corresponding to a local multicast group member on the fourth UPF and a multicast address list corresponding to a local multicast group member on a fifth UPF; and determine all group-level third groups of multicast rules corresponding to the intersection set as multicast rules required in the fourth UPF and the fifth UPF, the fifth UPF being a UPF in each UPF corresponding to the multicast group except the fourth UPF; and separately configure, for the fourth UPF and the fifth UPF when the intersection set changes, all the group-level third groups of multicast rules corresponding to the intersection set.

In an example embodiment, the apparatus further includes:
a configuration module 2340, configured to: calculate, when a multicast group member moves from the first UPF to a sixth UPF, an intersection set of a multicast address list corresponding to a local multicast group member on the sixth UPF and a multicast address list corresponding to a local multicast group member on a seventh UPF; and determine all group-level fourth groups of multicast rules corresponding to the intersection set as multicast rules required in the sixth UPF and the seventh UPF, the seventh UPF being a UPF in each UPF corresponding to the multicast group except the sixth UPF; and separately configure, for the sixth UPF and the seventh UPF when the intersection set changes, all the group-level fourth groups of multicast rules corresponding to the intersection set.

Figure 25:
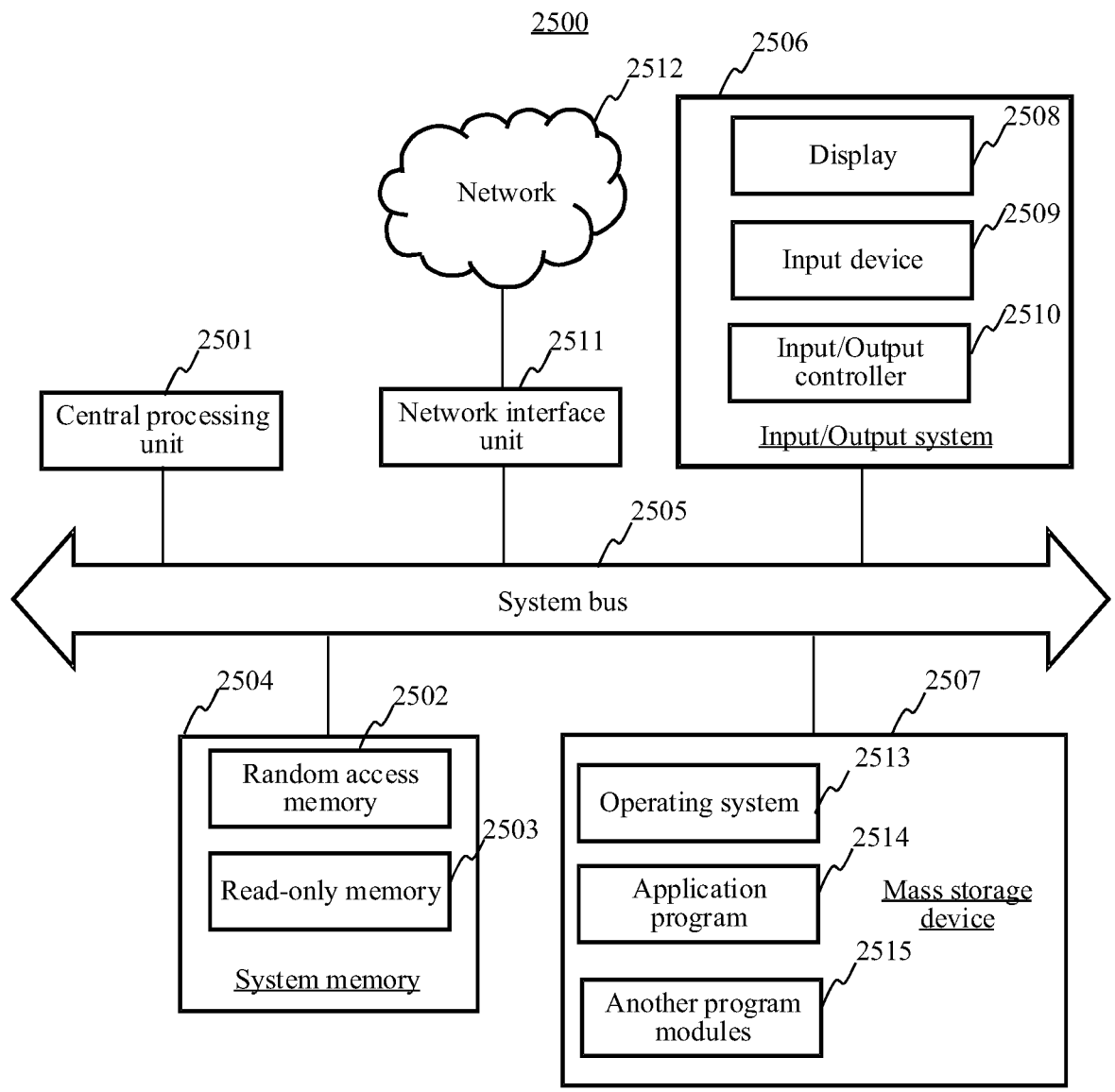
FIG. 25 is a block diagram of a computer device according to an example embodiment of the disclosure.

FIG. 25 is a block diagram of a computer device according to an example embodiment of the disclosure. Specifically, the computer device 2500 includes a central processing unit (CPU) 2501, a system memory 2504 including a random access memory (RAM) 2502 and a read-only memory (ROM) 2503, and a system bus 2505 connecting the system memory 2504 and the CPU 2501. The computer device 2500 further includes a basic input/output (I/O) system 2506 assisting in transmitting information between components in a computer, and a mass storage device 2507 configured to store an operating system 2513, an application program 2514, and another program module 2515.

The basic I/O system 2506 includes a display 2508 configured to display information and an input device 2509 such as a mouse or a keyboard that is configured for information inputting by a user. The display 2508 and the input device 2509 are both connected to the CPU 2501 by using an input/output controller 2510 connected to the system bus 2505. The basic I/O system 2506 may further include the input/output controller 2510, to receive and process inputs from a plurality of other devices, such as a keyboard, a mouse, or an electronic stylus. Similarly, the input/output controller 2510 further provides an output to a display screen, a printer, or another type of an output device.

The mass storage device 2507 is connected to the CPU 2501 by using a mass storage controller (not shown) connected to the system bus 2505. The mass storage device 2507 and an associated computer-readable medium provide non-volatile storage for the computer device 2500. In other words, the mass storage device 2507 may include a computer-readable medium (not shown) such as a hard disk or a CD-ROM drive.

Without loss of generality, the computer-readable media may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an EPROM, an EEPROM, a flash memory, or another solid-state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 2504 and the mass storage device 2507 may be collectively referred to as a memory.

The memory stores one or more programs, the one or more programs are configured to be executed by the one or more CPUs 2501 and includes instructions for implementing the multicast method of a virtual network group, and the CPU 2501 executes the one or more programs to implement the multicast method for a multicast group of a virtual network group provided in the foregoing method embodiments.

According to the embodiments of the disclosure, the computer device 2500 may further be connected, through a network such as the Internet, to a remote computer on the network for running. That is, the computer device 2500 may be connected to a network 2512 by using a network interface unit 2511 connected to the system bus 2505, or may be connected to another type of network or a remote computer system (not shown) by using a network interface unit 2511.

In an example, a UPF is running on the computer device, and the computer device includes a processor and a memory, where the memory stores a computer program, and the computer program is loaded and executed by the processor to implement the multicast method for a multicast group of a virtual network group according to the foregoing aspect.

In an example, an SMF is running on the computer device, and the computer device includes a processor and a memory, where the memory stores a computer program, and the computer program is loaded and executed by the processor to implement the multicast method for a multicast group of a virtual network group according to the foregoing aspect.

According to another aspect of the disclosure, a computer-readable storage medium is provided, the computer-readable storage medium storing at least one instruction, at least one program, a code set, or an instruction set, the at least one instruction, the at least one program, the code set, or the instruction set being loaded and executed by a processor to implement the multicast method for a multicast group of a virtual network group according to the foregoing aspect.

According to another aspect of the disclosure, a computer program product is provided, the computer program product storing at least one instruction, at least one program, a code set, or an instruction set, the at least one instruction, the at least one program, the code set, or the instruction set being loaded and executed by a processor to implement the multicast method for a multicast group of a virtual network group according to the foregoing aspect.

The technical solutions provided in the embodiments of the disclosure achieve at least the following beneficial effects.

When receiving a multicast data packet transmitted by a member in a virtual network group, a UPF transmits the multicast data packet to at least one target internal multicast interface, and transmits the multicast data packet to all multicast group members or all local multicast group members of a multicast group through the at least one target internal multicast interface, so that one-to-multiple network communication is implemented in the virtual network group, and a multicast function is implemented in the virtual network group.

"Plurality of" mentioned in this specification means two or more. "And/or" describes an association relationship for associated objects and represents that three relationships may exist. For example, A and/or B may represent the following three cases: only A exists, both A and B exist, and only B exists. The character "I" in this specification generally indicates an "or" relationship between the associated objects.

The sequence numbers of the foregoing embodiments of the disclosure are merely for description purpose, and are not intended to indicate the preference among the embodiments.

A person of ordinary skill in the art would understand that all or some of the steps of the foregoing embodiments may be implemented by hardware, or may be implemented by a program instructing related hardware. The program may be stored in a computer-readable storage medium. The storage medium may be a ROM, a magnetic disk, or an optical disc.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the disclosure, but are not intended to limit the disclosure. Any modification, equivalent replacement, or improvement and the like made within the spirit and principle of the disclosure fall within the protection scope of the disclosure.

What is claimed is:

1. A multicast method for a multicast group of a virtual network group, performed by a first user plane function (UPF), the method comprising:
receiving a multicast data packet transmitted by a member of the virtual network group, a destination address of the multicast data packet being a multicast address; and
transmitting the multicast data packet to at least one target internal multicast interface, and transmitting the multicast data packet to all multicast group members or all local multicast group members of the multicast group through the at least one target internal multicast interface, wherein the at least one target internal multicast interface is a dedicated interface for a multicast session;
the multicast group being a conventional multicast group in the virtual network group, or the multicast group being a group identified by using a virtual local area network identity (VID) and a multicast group member being a VID member,
wherein the at least one target internal multicast interface comprises a first internal multicast interface and a second internal multicast interface, and
wherein the transmitting the multicast data packet to the at least one target internal multicast interface comprise:
when receiving the multicast data packet transmitted by a local multicast group member through a first reference point or a second reference point, transmitting the multicast data packet to the first internal multicast interface and transmitting the multicast data packet, through the first internal multicast interface, to all the multicast group members of the multicast group through the first reference point or the second reference point or a third reference point or a fourth reference point corresponding to each multicast group member of the multicast group; and
when receiving the multicast data packet transmitted by a non-local multicast group member through the third reference point or the fourth reference point, transmitting the multicast data packet to the second internal multicast interface, and transmitting the multicast data, through the second internal multicast interface, to all the local multicast group members of the multicast group through the first reference point or the second reference point corresponding to each local multicast group member of the multicast group in the first UPF,
the first reference point being a reference point between an access network and the first UPF, the second reference point being a reference point between the first UPF and an internal UPF, the third reference point being a reference point between the first UPF and a data network, and the fourth reference point being a reference point between the first UPF and another protocol data unit session anchor user plane function (PSA UPF).

2. The method according to claim 1, wherein a first packet detection rule (PDR) and a first forwarding action rule (FAR) that correspond to the multicast group member in the multicast group are set in the first UPF; and
the transmitting the multicast data packet to the first internal multicast interface comprises:
transmitting the multicast data packet to the first internal multicast interface by using the first FAR based on detection, by using the first PDR, that the multicast data packet is multicast data from the first reference point or the second reference point.

3. The method according to claim 2, wherein
based on there being one first internal multicast interface, the first PDR comprises that: a source interface is set to an access side, a target address is set to a first multicast address list to which the multicast group member belongs, and core network tunnel information is set to a tunnel header of the first reference point or the second reference point of a protocol data unit (PDU) session; and the first FAR comprises that: a target interface is set to the first internal multicast interface; or
based on there being m first internal multicast interfaces, an $i^{th}$ first internal multicast interface corresponds to an $i^{th}$ multicast address in the first multicast address list, the $i^{th}$ multicast address is a multicast address in the multicast data packet, and the first PDR comprises that: the source interface is set to the access side, the target address is set to the $i^{th}$ multicast address, and the core network tunnel information is set to the tunnel header of the first reference point or the second reference point of the PDU session; and the first FAR comprises that: the target interface is set to the $i^{th}$ first internal multicast interface, m being a positive integer, and i being an integer not greater than m; or
based on there being the one first internal multicast interface, the first PDR comprises that: the source interface is set to the access side, the target address is set to a first VID list to which the VID member belongs and a broadcast address, and the core network tunnel information is set to the tunnel header of the first reference point or the second reference point of the PDU session; and the first FAR comprises that: the target interface is set to the first internal multicast interface; or
based on there being the m first internal multicast interfaces, the $i^{th}$ first internal multicast interface corresponds to an $i^{th}$ VID in the first VID list, the $i^{th}$ VID and a broadcast address are the multicast address in the multicast data packet, and the first PDR comprises that: the source interface is set to the access side, the target address is set to the $i^{th}$ VID and the broadcast address, and the core network tunnel information is set to the tunnel header of the first reference point or the second reference point of the PDU session; and the first FAR comprises that: the target interface is set to the $i^{th}$ first internal multicast interface.

4. The method according to claim 3, wherein
the multicast address in the multicast data packet is a multicast address in the first multicast address list; or
the multicast address in the multicast data packet is a VID in the first VID list and a broadcast address.

5. The method according to claim 1, wherein with respect to receiving multicast data from the third reference point, a second PDR and a second FAR that correspond to a group-level session are set in the first UPF, and the group-level session is a session between the first UPF and a session management function (SMF); and
the transmitting the multicast data packet to the second internal multicast interface comprises:
transmitting the multicast data packet to the second internal multicast interface by using the second FAR in a case of detecting, by using the second PDR, that the multicast data packet is multicast data from the third reference point.

6. The method according to claim 5, wherein
- based on there being one second internal multicast interface, the second PDR comprises that: a source interface is set to a core side, and a target address is set to a second multicast address list; and the second FAR comprises that: a target interface is set to the second internal multicast interface; or
- based on there being m second internal multicast interfaces, an $i^{th}$ second internal multicast interface corresponds to an $i^{th}$ multicast address in the second multicast address list, the $i^{th}$ multicast address is a multicast address in the multicast data packet, and the second PDR comprises that: the source interface is set to the core side, and the target address is set to the $i^{th}$ multicast address; and the second FAR comprises that: the target interface is set to the $i^{th}$ second internal multicast interface, m being a positive integer, and i being an integer not greater than m; or
- based on there being the one second internal multicast interface, the second PDR comprises that: the source interface is set to the core side, and the target address is set to a second VID list and a broadcast address; and the second FAR comprises that: the target interface is set to the second internal multicast interface; or
- based on there being m second internal multicast interfaces, the $i^{th}$ second internal multicast interface corresponds to an $i^{th}$ VID in the second VID list, the $i^{th}$ VID and a broadcast address are the multicast address in the multicast data packet, and the second PDR comprises that: the source interface is set to the core side, and the target address is set to the $i^{th}$ VID and the broadcast address; and the second FAR comprises that: the target interface is set to the $i^{th}$ second internal multicast interface.

7. The method according to claim 6, wherein
- the second multicast address list is a multicast address list of all multicast groups in the virtual network group; or
- the second multicast address list is a set of multicast address lists of multicast groups to which all local multicast group members in the first UPF belong; or
- the second VID list is a VID list of all VIDs in the virtual network group; or
- the second VID list is a set of VID lists to which all local VID members in the first UPF belong.

8. The method according to claim 1, wherein with respect to receiving multicast data from the fourth reference point, a third PDR and a third FAR that correspond to a group-level session are set in the first UPF, and the group-level session is a session between the first UPF and an SMF; and
- the transmitting the multicast data packet to the second internal multicast interface comprises:
- transmitting the multicast data packet to the second internal multicast interface by using the third FAR in a case of detecting, by using the third PDR, that the multicast data packet is multicast data from the fourth reference point.

9. The method according to claim 8, wherein
- based on there being one second internal multicast interface, the third PDR comprises that: a source interface is set to a core side, a target address is set to a third multicast address list, and core network tunnel information is set to a tunnel header of the fourth reference point; and the third FAR comprises that: a target interface is set to the second internal multicast interface; or
- based on there being m second internal multicast interfaces, an $i^{th}$ second internal multicast interface corresponds to an $i^{th}$ multicast address in the third multicast address list, the $i^{th}$ multicast address is a multicast address in the multicast data packet, and the third PDR comprises that: the source interface is set to the core side, the target address is set to the $i^{th}$ multicast address, and the core network tunnel information is set to the tunnel header of the fourth reference point; and the third FAR comprises that: the target interface is set to the $i^{th}$ second internal multicast interface, m being a positive integer, and i being an integer not greater than m; or
- based on there being the one second internal multicast interface, the third PDR comprises that: the source interface is set to the core side, the target address is set to a third VID list and a broadcast address, and the core network tunnel information is set to the tunnel header of the fourth reference point; and the third FAR comprises that: the target interface is set to the second internal multicast interface; or
- based on there being the m second internal multicast interfaces, the $i^{th}$ second internal multicast interface corresponds to an $i^{th}$ VID in the third VID list, the $i^{th}$ VID and a broadcast address are the multicast address in the multicast data packet, and the third PDR comprises that: the source interface is set to the core side, the target address is set to the $i^{th}$ VID and the broadcast address, and the core network tunnel information is set to the tunnel header of the fourth reference point; and the third FAR comprises that: the target interface is set to the $i^{th}$ second internal multicast interface.

10. The method according to claim 9, wherein
- the third multicast address list is a multicast address list of all multicast groups in the virtual network group; or
- the third multicast address list is an intersection set of a multicast address list of multicast groups to which local multicast group members in the first UPF belong and a multicast address list of multicast groups to which local multicast group members of a second UPF belong, and the second UPF is connected to the first UPF through the fourth reference point; or
- the third VID list is a VID list of all VIDs in the virtual network group; or
- the third VID list is an intersection set of a VID list to which local VID members in the first UPF belong and a VID list to which local VID members of the second UPF belong, and the second UPF is connected to the first UPF through the fourth reference point.

11. The method according to claim 1, wherein a fourth PDR and a fourth FAR that correspond to the multicast group member in the multicast group are set in the first UPF; and
- the transmitting, through the first internal multicast interface, the multicast data packet from the first reference point or the second reference point or the third reference point or the fourth reference point corresponding to each multicast group member of the multicast group to all the multicast group members of the multicast group comprises:
- transmitting, by using the fourth FAR, the multicast data packet from the first reference point or the second reference point or the third reference point or the fourth reference point corresponding to each multicast group member of the multicast group to all the multicast group members of the multicast group in a case of detecting, by using the fourth PDR, that the multicast data packet is multicast data from the first internal multicast interface.

12. The method according to claim 11, wherein
based on there being one first internal multicast interface:
the fourth PDR comprises that: a source interface is set to the first internal multicast interface, and a target address is a first multicast address list to which the multicast group member belongs; and
the fourth FAR comprises that: an external header creates tunnel information indicating the first reference point or the second reference point, and a target interface is an access side; or the fourth FAR further comprises that: the external header creates tunnel information indicating the third reference point, and the target interface is a core side; or the fourth FAR further comprises that: the external header creates tunnel information indicating the fourth reference point, and the target interface is the core side; or
based on there being m first internal multicast interfaces:
an $i^{th}$ first internal multicast interface corresponds to an $i^{th}$ multicast address in the first multicast address list, and the $i^{th}$ multicast address is a multicast address in the multicast data packet; and
the fourth PDR comprises that: the source interface is set to the $i^{th}$ first internal multicast interface, and the target address is the $i^{th}$ multicast address; and the fourth FAR comprises that: the external header creates tunnel information indicating the first reference point or the second reference point, and the target interface is the access side; or the fourth FAR further comprises that: the external header creates tunnel information indicating the third reference point, and the target interface is the core side; or the fourth FAR further comprises that: the external header creates tunnel information indicating the fourth reference point, and the target interface is the core side; or
based on there being the one first internal multicast interface:
the fourth PDR comprises that: the source interface is set to the first internal multicast interface, and the target address is a first VID list to which the VID member belongs and a broadcast address; and
the fourth FAR comprises that: the external header creates tunnel information indicating the first reference point or the second reference point, and the target interface is the access side; or the fourth FAR further comprises that: the external header creates tunnel information indicating the third reference point, and the target interface is the core side; or the fourth FAR further comprises that: the external header creates tunnel information indicating the fourth reference point, and the target interface is the core side; or
based on there being the m first internal multicast interfaces:
the $i^{th}$ first internal multicast interface corresponds to an $i^{th}$ VID in the first VID list, and the $i^{th}$ VID and a broadcast address are the multicast address in the multicast data packet; and
the fourth PDR comprises that: the source interface is set to the $i^{th}$ first internal multicast interface, and the target address is the $i^{th}$ VID and the broadcast address; and the fourth FAR comprises that: the external header creates tunnel information indicating the first reference point or the second reference point, and the target interface is the access side; or the fourth FAR further comprises that: the external header creates tunnel information indicating the third reference point, and the target interface is the core side; or the fourth FAR further comprises that: the external header creates tunnel information indicating the fourth reference point, and the target interface is the core side;
m being a positive integer, and i being an integer not greater than m.

13. The method according to claim 10, wherein with respect to receiving multicast data from the third reference point, a fifth PDR and a fifth FAR that correspond to a group-level session are set in the first UPF, and the group-level session is a session between the first UPF and an SMF; and
the transmitting, through the second internal multicast interface, the multicast data packet from the first reference point or the second reference point corresponding to each local multicast group member of the multicast group in the first UPF to all the local multicast group members of the multicast group comprises:
transmitting, by using the fifth FAR, the multicast data packet from the first reference point or the second reference point corresponding to each local multicast group member of the multicast group in the first UPF to all the local multicast group members of the multicast group in a case of detecting, by using the fifth PDR, that the multicast data packet is multicast data from the second internal multicast interface.

14. The method according to claim 13, wherein
based on there being one second internal multicast interface, the fifth PDR comprises that: a source interface is set to the second internal multicast interface, and a target address is a second multicast address list; and the fifth FAR comprises that: an external header creates tunnel information indicating the first reference point or the second reference point, and a target interface is an access side; or
based on there being m second internal multicast interfaces, an $i^{th}$ second internal multicast interface corresponds to an $i^{th}$ multicast address in the second multicast address list, the $i^{th}$ multicast address is a multicast address in the multicast data packet, and the fifth PDR comprises that: the source interface is set to the $i^{th}$ second internal multicast interface, and the target address is the $i^{th}$ multicast address; and the fifth FAR comprises that: the external header creates tunnel information indicating the first reference point or the second reference point, and the target interface is the access side, m being a positive integer, and i being an integer not greater than m; or
based on there being the one second internal multicast interface, the fifth PDR comprises that: the source interface is set to the second internal multicast interface, and the target address is a second VID list and a broadcast address; and the fifth FAR comprises that: the external header creates tunnel information indicating the first reference point or the second reference point, and the target interface is the access side; or
based on there being the m second internal multicast interfaces, the $i^{th}$ second internal multicast interface corresponds to an $i^{th}$ VID in the second VID list, the $i^{th}$ VID and a broadcast address are the multicast address in the multicast data packet, and the fifth PDR comprises that: the source interface is set to the $i^{th}$ second internal multicast interface, and the target address is the $i^{th}$ VID and the broadcast address; and the fifth FAR comprises that: the external header creates tunnel information indicating the first reference point or the second reference point, and the target interface is the access side.

15. The method according to claim 10, wherein with respect to receiving multicast data from the fourth reference point, a sixth PDR and a sixth FAR that correspond to a group-level session are set in the first UPF, and the group-level session is a session between the first UPF and an SMF; and the transmitting, through the second internal multicast interface, the multicast data packet from the first reference point or the second reference point corresponding to each local multicast group member of the multicast group in the first UPF to all the local multicast group members of the multicast group comprises:

transmitting, by using the sixth FAR, the multicast data packet from the first reference point or the second reference point corresponding to each local multicast group member of the multicast group in the first UPF to all the local multicast group members of the multicast group in a case of detecting, by using the sixth PDR, that the multicast data packet is multicast data from the second internal multicast interface.

16. The method according to claim 15, wherein based on there being one second internal multicast interface, the sixth PDR comprises that: a source interface is set to the second internal multicast interface, and a target address is a third multicast address list; and the sixth FAR comprises that: an external header creates tunnel information indicating the first reference point or the second reference point, and a target interface is an access side; or based on there being m second internal multicast interfaces, an $i^{th}$ second internal multicast interface corresponds to an $i^{th}$ multicast address in the third multicast address list, the $i^{th}$ multicast address is a multicast address in the multicast data packet, and the sixth PDR comprises that: the source interface is set to the $i^{th}$ second internal multicast interface, and the target address is the $i^{th}$ multicast address; and the sixth FAR comprises that: the external header creates tunnel information indicating the first reference point or the second reference point, and the target interface is the access side, m being a positive integer, and i being an integer not greater than m; or based on there being the one second internal multicast interface, the sixth PDR comprises that: the source interface is set to the second internal multicast interface, and the target address is a third VID list and a broadcast address; and the sixth FAR comprises that: the external header creates tunnel information indicating the first reference point or the second reference point, and the target interface is the access side; or based on there being the m second internal multicast interfaces, the $i^{th}$ second internal multicast interface corresponds to an $i^{th}$ VID in the third VID list, the $i^{th}$ VID and a broadcast address are the multicast address in the multicast data packet, and the sixth PDR comprises that: the source interface is set to the $i^{th}$ second internal multicast interface, and the target address is the $i^{th}$ VID and the broadcast address; and the sixth FAR comprises that: the external header creates tunnel information indicating the first reference point or the second reference point, and the target interface is the access side.

17. A multicast method for a multicast group of a virtual network group, performed by a first user plane function (UPF), the method comprising:

receiving a multicast data packet transmitted by a member of the virtual network group, a destination address of the multicast data packet being a multicast address; and transmitting the multicast data packet to at least one target internal multicast interface, and transmitting the multicast data packet to all multicast group members or all local multicast group members of the multicast group through the at least one target internal multicast interface, wherein the at least one target internal multicast interface is a dedicated interface for a multicast session;

the multicast group being a conventional multicast group in the virtual network group, or the multicast group being a group identified by using a virtual local area network identity (VID) and a multicast group member being a VID member, wherein the at least one target internal multicast interface comprises a first internal multicast interface, a second internal multicast interface, and a third internal multicast interface; and the transmitting the multicast data packet to the at least one target internal multicast interface comprises:

when receiving the multicast data packet transmitted by a local multicast group member through a first reference point or a second reference point, transmitting the multicast data packet to the first internal multicast interface and transmitting the multicast data packet, through the first internal multicast interface, to all the multicast group members of the multicast group through the first reference point or the second reference point or a third reference point or a fourth reference point corresponding to each multicast group member of the multicast group;

when receiving the multicast data packet transmitted by a non-local multicast group member through the third reference point, transmitting the multicast data packet to the second internal multicast interface, and transmitting the multicast data packet, through the second internal multicast interface, to all the local multicast group members of the multicast group through the first reference point or the second reference point corresponding to each local multicast group member of the multicast group in the first UPF; and when receiving the multicast data packet transmitted by a non-local multicast group member through the fourth reference point, transmitting the multicast data packet to the third internal multicast interface, and transmitting the multicast data packet, through the third internal multicast interface, to all the local multicast group members of the multicast group through the first reference point or the second reference point corresponding to each local multicast group member of the multicast group in the first UPF;

the first reference point being a reference point between an access network and the first UPF, the second reference point being a reference point between the first UPF and an internal UPF, the third reference point being a reference point between the first UPF and a data network, and the fourth reference point being a reference point between the first UPF and another PSA UPF.

18. A multicast apparatus for a multicast group of a virtual network group, applicable to a first user plane function (UPF), the apparatus comprising:

at least one memory configured to store program code; and at least one processor configured to read the program code and operate as instructed by the program code, the program code comprising:

receiving code configured to cause the at least one processor to receive a multicast data packet transmitted by a member of the virtual network group, a destination address of the multicast data packet being a multicast address; and transmitting code configured to cause the at least one processor to transmit the multicast data packet to at least one target internal multicast interface, and transmit the multicast data packet to all multicast group members or all local multicast group members of the multicast group through the at least one target internal multicast interface, wherein the at least one target internal multicast interface is a dedicated interface for a multicast session;

the multicast group being a conventional multicast group in the virtual network group, or the multicast group being a group identified by using a virtual local area network identity (VID) and a multicast group member being a VID member, wherein the at least one target internal multicast interface comprises a first internal multicast interface and a second internal multicast interface, and wherein the transmitting code configured to cause the at least one processor to:

when receiving the multicast data packet transmitted by a local multicast group member through a first reference point or a second reference point, transmit the multicast data packet to the first internal multicast interface and transmit the multicast data packet, through the first internal multicast interface, to all the multicast group members of the multicast group through the first reference point or the second reference point or a third reference point or a fourth reference point corresponding to each multicast group member of the multicast group; and when receiving the multicast data packet transmitted by a non-local multicast group member through the third reference point or the fourth reference point, transmit the multicast data packet to the second internal multicast interface, and transmit the multicast data, through the second internal multicast interface, to all the local multicast group members of the multicast group through the first reference point or the second reference point corresponding to each local multicast group member of the multicast group in the first UPF, the first reference point being a reference point between an access network and the first UPF, the second reference point being a reference point between the first UPF and an internal UPF, the third reference point being a reference point between the first UPF and a data network, and the fourth reference point being a reference point between the first UPF and another protocol data unit session anchor user plane function (PSA UPF).

* * * * *